(12) United States Patent
Hoshi

(10) Patent No.: US 6,947,215 B2
(45) Date of Patent: Sep. 20, 2005

(54) OPTICAL ELEMENT, OPTICAL FUNCTIONAL DEVICE, POLARIZATION CONVERSION DEVICE, IMAGE DISPLAY APPARATUS, AND IMAGE DISPLAY SYSTEM

(75) Inventor: Hikaru Hoshi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/327,182

(22) Filed: Dec. 24, 2002

(65) Prior Publication Data

US 2003/0156325 A1 Aug. 21, 2003

(30) Foreign Application Priority Data

Dec. 27, 2001 (JP) .................................. 2001-397901
Aug. 21, 2002 (JP) .................................. 2002-240388
Aug. 21, 2002 (JP) .................................. 2002-240702

(51) Int. Cl.$^7$ .............................................. G02B 5/18
(52) U.S. Cl. ........................ 359/576; 359/569; 349/96
(58) Field of Search ................... 359/486, 566, 359/483, 569, 576; 349/96

(56) References Cited

U.S. PATENT DOCUMENTS

| | | | | |
|---|---|---|---|---|
| 3,610,729 | A | * 10/1971 | Rogers | ....................... 359/488 |
| 5,335,240 | A | 8/1994 | Ho et al. | ...................... 372/39 |
| 5,696,584 | A | 12/1997 | Franz et al. | ................. 356/356 |
| 5,847,872 | A | 12/1998 | Ito | ............................. 359/494 |
| 5,847,877 | A | * 12/1998 | Imamura et al. | ........... 359/566 |
| 6,234,634 | B1 | * 5/2001 | Hansen et al. | ................. 353/20 |
| 6,273,569 | B1 | * 8/2001 | Iechika et al. | ................ 353/38 |
| 6,404,554 | B1 | * 6/2002 | Lee et al. | .................... 359/576 |
| 6,468,348 | B1 | 10/2002 | Grüning et al. | ............... 117/94 |
| 6,661,952 | B2 | * 12/2003 | Simpson et al. | ............. 385/37 |
| 2001/0016247 | A1 | * 8/2001 | Matsuura et al. | ........... 428/188 |
| 2002/0089750 | A1 | 7/2002 | Hoshi et al. | ................. 359/566 |

FOREIGN PATENT DOCUMENTS

| | | |
|---|---|---|
| JP | 5-107412 | 4/1993 |
| JP | 5-333211 | 12/1993 |
| JP | 8-254607 | 10/1996 |
| JP | 9-145921 | 6/1997 |

OTHER PUBLICATIONS

Hisao Kikuta et al., "Achromatic Quarter–Wave Plates Using the Dispersion of Form Birefringence," 36(7) *Appl. Opt.* 1566–1572 (Mar. 1997).

Eric B. Grann et al., "Comparison Between Continuous and Discrete Subwavelength Grating Structures for Antireflection Surfaces," 13(5) *J. Opt. Soc. Am.* 988–992 (May 1996).

Borne & Wolfe, *Principles of Optics*, 6$^{th}$ ed., pp. 705–708 (1980).

* cited by examiner

*Primary Examiner*—Thong Nguyen
*Assistant Examiner*—Arnel C. Lavarias
(74) *Attorney, Agent, or Firm*—Fitzpatrick, Cella, Harper & Scinto

(57) ABSTRACT

Optical elements have a plurality of periodic structures in which each period is smaller than the wavelength of usable light. Embodiments are provided in which a desired phase difference can be obtained at least at two wavelengths in a used wavelength region, in which periodic directions of a plurality of structures are perpendicular to each other, and in which the difference in refractive index between individual structures for a predetermined polarization component is set to a predetermined value or less.

18 Claims, 22 Drawing Sheets

PHASE DIFFERENCE
(MULTILAYER TYPE PHASE PLATE)

| | MATERIAL | FF | d(μm) | n(A) | n(B) |
|---|---|---|---|---|---|
| ni | air | | | 1.000 | 1.000 |
| n3 | SiO2 | 0.60 | 0.10 | 1.230 | 1.313 |
| n2 | Ta2O5 | 0.60 | 0.24 | 1.436 | 1.823 |
| n1 | Ta2O5 | 0.81 | 0.96 | 1.993 | 1.733 |
| ns | Ta2O5 | | | 2.139 | 2.139 |

LIGHT TRANSMITTANCE
($\theta = 0°$, POLARIZED-LIGHT AVERAGE)

PHASE DIFFERENCE
(TRANSMISSION, $\theta = 0°$)

LIGHT TRANSMITTANCE
($\theta = 0°$, $\theta = 20°$, POLARIZED-LIGHT AVERAGE)

INCIDENT ANGLE CHARACTERISTICS
(TRANSMISSON, $\theta = 0°$, $\theta = 20°$)

PHASE DIFFERENCE (QUARTZ PLATE)

OPTICAL ELEMENT, OPTICAL FUNCTIONAL DEVICE, POLARIZATION CONVERSION DEVICE, IMAGE DISPLAY APPARATUS, AND IMAGE DISPLAY SYSTEM

BACKGROUND OF THE INVENTION

1. Field of the Invention

The present invention relates to optical elements each using a structural birefringence effect provided for minute periodic grating structures whose periods are each smaller than the wavelength of usable light, and relates to optical modulation devices, optical devices, and image display apparatuses, which are provided with the optical elements described above.

2. Description of the Related Art

Hitherto, as birefringence materials, for example, crystal materials such as calcite and quartz, liquid crystal materials, and plastic and polymeric materials having birefringence effects have been known. These birefringence materials have been used, for example, for phase plates (quarter wave plates, half wave plates) and low pass filters. In recent years, the birefringence materials have been increasingly important as materials used for various products such as liquid crystal projectors, liquid crystal displays, digital still cameras, and the like.

In addition, by forming a periodic structure having a minute period smaller than the wavelength of usable light on a substrate, a birefringence effect can be obtained. The birefringence effect obtained by the structure described above has been well known as the structural birefringence (Born & Wolf, Principles of optics 6th edition, p. 705).

As features of the structural birefringence, there may be mentioned:

(1) the amount of birefringence can be optionally controlled by design of minute periodic structures, and (2) a large amount of birefringence can be obtained as compared to that obtained by a conventional material such as quartz.

In FIG. 39, an example of a one-dimensional grating shape having the structural birefringence effect is shown. In order to realize the structural birefringence, two materials 31 and 32 are used having refractive indices different from each other in periodic direction A of the grating. In FIG. 39, as a low refractive index material 32, air is used; however, as shown in FIG. 40, the structural birefringence can be realized in the structure in which a great number of grating materials 41 and 42 having refractive indices different from each other are alternately adhered to each other.

In the example shown in FIG. 40, the structure having a structural birefringence effect is shown in which two grating materials having different refractive indices (the grating materials 41 and 42) are used.

The structure described above can be formed, for example, by etching, electron beam drawing, LIGA process, photolithography, multiple-light-flux laser interference, or multilayer thin-film formation.

In addition, the amount of birefringence of a one-dimensional grating structure can be controlled using the refractive indices of materials, grating periods $\Lambda$, and filling factors FF as parameters. Filling factor FF is represented by a ratio (FF=w/$\Lambda$) of width w of one of two materials forming the grating shape (in the case shown in FIG. 39, the width of the material 31) to grating period $\Lambda$. For the estimation of apparent refractive indices (hereinafter referred to as "effective refractive index") of ordinary and extraordinary light, an effective medium theory (EMT) can be used.

In a conventional technique disclosed in Japanese Unexamined Patent Application Publication No. 5-107412, a birefringence structure having a period of one half or less of light wavelength has been disclosed; however, in this publication, the birefringence structure is only described, and a phase plate having a small wavelength dependence is not described at all.

In addition, in Japanese Unexamined Patent Application Publication No. 5-333211, a phase plate in which phase differences equivalent to each other can be obtained at many wavelengths has been disclosed. However, a material forming the phase plate is composed of various anisotropic crystal plates, and a phase plate using the structural birefringence is not described.

Furthermore, in Japanese Unexamined Patent Application Publication No. 8-254607 (corresponding to U.S. Pat. No. 5,696,584), a transmissive phase grating has been disclosed; however, only a one-dimensional grating is described as the grating structure.

In addition, in Japanese Unexamined Patent Application Publication No. 9-145921 (corresponding to U.S. Pat. No. 5,847,872), a first material and a second material, having refractive indices different from each other, are used for forming a phase plate functioning as a structural refractive body; however, the structural birefringence is realized by the two materials which are alternately disposed in a plane perpendicular to the direction of usable light flux, and reduction in wavelength dependence of phase difference is not described at all.

In a recent technical paper (H. Kikuta et al. Apply Opt. Vol. 36, No. 7, pp. 1566 to 1572, 1997), a phase plate having a one-dimensional grating shape has been disclosed. However, an antireflection function is provided by forming the structure in which an antireflection film is provided on the surface of the phase plate, only the grating portion generates the phase difference, and the antireflection film itself generates no phase difference. Accordingly, in this technical paper, the phase difference between ordinary light and extraordinary light is not realized by the use of two types of materials for forming a grating portion.

Since it has been difficult to control the wavelength dependence of the amount of birefringence by using conventional birefringence materials, it also has been difficult to control the wavelength dependence of the phase difference between ordinary light and extraordinary light. When a monochromatic light source such as a laser for emitting a single wavelength is used, the phase difference can be optimized at a designed wavelength; however, in an optical system in which light including various wavelength rays, such as white light, is used, serious problems may occur when a phase plate has the wavelength dependence. For example, in the case of a liquid crystal projector using light in the visible light region, optical loss occurs at a liquid crystal panel or a color separation device, resulting in decrease in light usage efficiency of the entire system and degradation of image quality.

As described above, in order to improve the light usage efficiency and image quality in optical systems and to realize thinner optical elements, it is significantly important to use a phase plate having less wavelength dependence of phase difference in the visible light region.

SUMMARY OF THE INVENTION

An object of the present invention is to provide a high-performance optical element having minute periodic structures in which each period is smaller than the wavelength of usable light, and an image display apparatus using the optical element described above.

According to one aspect of the present invention, an optical element having minute periodic structures is disclosed having periods each being smaller than the wavelength of usable light. For example, there will be disclosed an embodiment in which a desired phase difference can be obtained at at least two wavelengths in a used wavelength region, an embodiment in which a plurality of structures is disposed so that the periodic directions thereof are perpendicular to each other, and an embodiment in which the difference in refractive index for a predetermined polarization component between structures is set to a predetermined value or less.

According to the embodiments described above, an optical element having less wavelength dependence can be realized.

The particular structure of this optical element will be disclosed in preferred embodiments described below.

Further objects, features and advantages of the present invention will become apparent from the following description of the preferred embodiments with reference to the attached drawings.

DETAILED DESCRIPTION OF THE PREFERRED EMBODIMENTS

Figure 1:
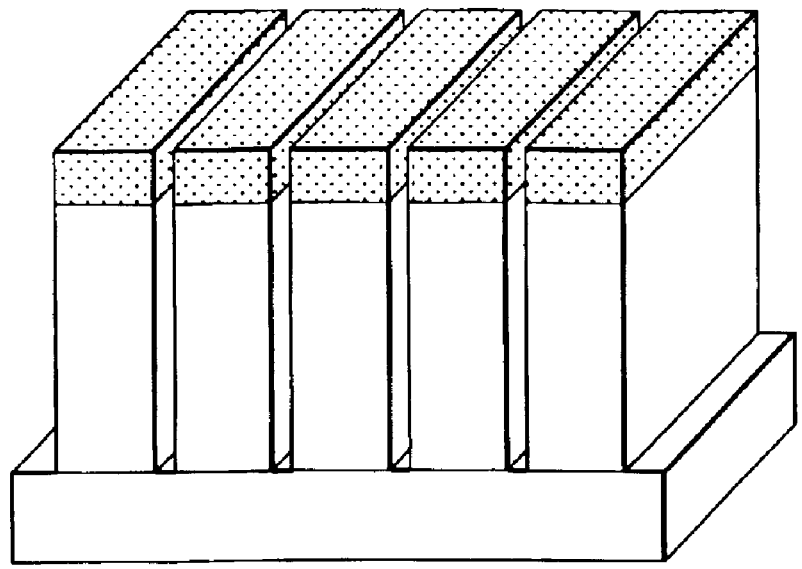
FIG. 1 is a schematic view showing a phase plate of a first example according to the present invention.

Before the preferred embodiments of the present invention are described, in order to facilitate understanding of the present invention, a phase plate made of quartz, according to a conventional technique, will first be described. In addition, effective refractive indices of a minute periodic structure, which correspond to the refractive indices of ordinary light and extraordinary light of quartz, will also be described.

A λ/4 plate made of quartz using a birefringence effect will be described by way of example. The refractive indices (no, ne) of ordinary light and extraordinary light of quartz at a wavelength of 0.5893 μm are 1.5433 (no) and 1.5534 (ne), respectively, and the difference (Δn) in refractive index is 0.0091.

As a method for designing a λ/4 plate, thickness d of quartz, at which phase difference λ/4 can be obtained at a designed wavelength $\lambda_0$ of 0.55 μm, is calculated by equation (A) shown below.

$$\Delta n d = \lambda_0/4 \tag{A}$$

As a result, it is understood that the λ/4 plate made of quartz must have a thickness of 15.3 μm. The characteristics of this phase plate described above are shown in FIG. 41. The transverse axis represents the wavelength, and the vertical axis represents the phase difference between ordinary light and extraordinary light. As can be seen from FIG. 41, at a designed wavelength of 0.55 μm, a phase difference of 90° (λ/4) is obtained, and hence the performance of the λ/4 plate is satisfied; however, at wavelengths longer and shorter than 0.55 μm, the phase difference is shifted from 90°. In addition, as the wavelength increases or decreases from designed wavelength λ, the phase difference is increasingly shifted from 90°. That is, it means that the λ/4 plate made of quartz used as a birefringence material has wavelength dependence in the visible light region.

In the case of quartz, the amount of birefringence depends on the difference in refractive index represented by Δn=no−ne, in which no indicates the refractive index of ordinary light, and ne indicates the refractive index of extraordinary light. In the case of a minute periodic structure, as the values corresponding to that described above, effective refractive indices are used. In particular, when polarized light having a polarization component perpendicular to the periodic direction of a grating of the minute periodic structure is represented by TE polarized light, and polarized light having a polarization component parallel to the periodic direction of the grating is represented by TM polarized light, n(TE) and n(TM) indicate the effective refractive indices for the TE polarized light and the TM polarized light, respectively. In this case, the difference in refractive index is represented by Δn=n(TE)−n(TM). The effective refractive index can be obtained using an effective medium theory (EMT).

The method for calculating the effective refractive index of a one-dimensional periodic structure is disclosed by Born & Wolf in "Principles of Optics 6th edition", pp. 706 to 707. In particular, the effective refractive indices can be represented by the following equations.

$$n(TE) = \{ns^2 FF + ni^2(1-FF)\}^{1/2} \tag{1}$$

$$n(TM) = \{(1/ns^2)FF + (1/ni^2)(1-FF)\}^{-1/2} \tag{2}$$

In the above equations, ns indicates the refractive index of one of two materials forming the minute periodic structure, ni indicates the refractive index of the other material. FF is a filling factor which is represented by a ratio of length w of the material having refractive index ns along the periodic direction to grating period Λ (FF=w/Λ). In addition, the difference in refractive index Δn is represented by the following equation.

$$\Delta n = n(TE) - n(TM) \tag{3}$$

Based on this description, hereinafter, the preferred embodiments of the present invention will be described in detail.

In some of the embodiments of the present invention, optical elements formed by laminating minute periodic structures, each period being smaller than the wavelength of usable light, in various manners will be described. For example, there may be mentioned an embodiment in which a desired phase difference can be obtained at at least two wavelengths in a used wavelength region, an embodiment in which a plurality of structures is disposed so that the periodic directions thereof are perpendicular to each other, and an embodiment in which the difference in refractive indices of structures for a predetermined polarization component is set to a predetermined value or less.

First, the embodiment in which a desired phase difference is obtained at at least two wavelengths in a used wavelength region will be described.

Figure 41:
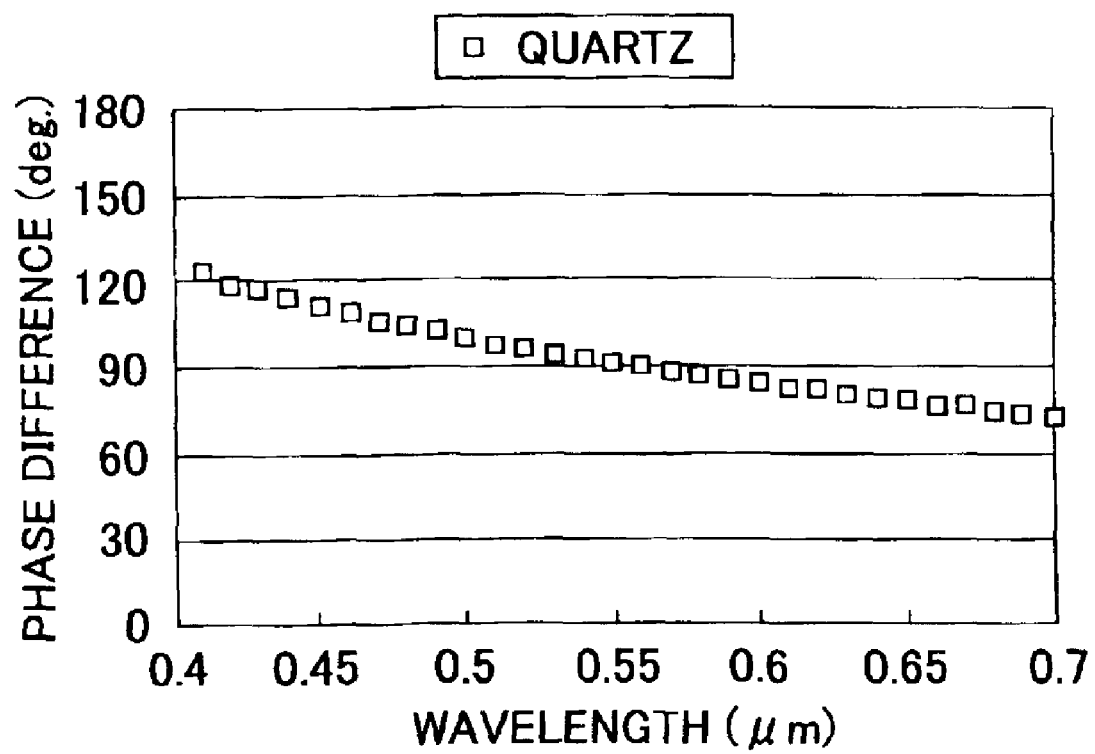
FIG. 41 is a graph showing phase difference characteristics of a conventional quartz plate.

The phase plate made of quartz shown in FIG. 41 has one designed wavelength at which an exact phase difference of 90° is obtained. In addition, as the wavelength is decreased or increased from designed wavelength λ, the change from a phase difference of 90° is increased. In contrast, in this embodiment, there are two designed wavelengths. Since a phase difference of 90° (in the case of λ/4 plate) is obtained at the two designed wavelengths, the change in phase difference can be decreased in a broad visible light region, and the wavelength dependence of the phase difference can be reduced. When the following conditions are satisfied, two designed wavelengths can be obtained.

In a plurality of periodic structures laminated to each other and provided on a substrate, each having a period smaller than the predetermined wavelength of usable light, when the plurality of periodic structures comprises k periodic structures (k is an integer of one or more) each having a period in a first direction parallel to the substrate and l periodic structures (l is an integer of zero or more) each having a period in a second direction perpendicular to the first direction, the following equation is satisfied for two designed wavelengths $\lambda_1$ and $\lambda_2$ in the visible light region.

$$\left(\sum_{i=1}^{K} \Delta n_i d_i - \sum_{j=0}^{l} \Delta n_j d_j\right)\bigg/\lambda_1 = \left(\sum_{i=1}^{K} \Delta n'_i d_i - \sum_{j=0}^{l} \Delta n'_j d_j\right)\bigg/\lambda_2 \tag{4}$$

In the above equation, $\Delta n_i$ indicates the difference of the refractive index of an ith periodic structure, having the period in the first direction, for TE polarized light from that for TM polarized light with respect to designed wavelength $\lambda_1$;

$d_i$ indicates the thickness of the ith periodic structure having the period in the first direction;

$\Delta n_j$ indicates the difference of the refractive index of a jth periodic structure, having the period in the second direction, for TE polarized light from that for TM polarized light with respect to designed wavelength $\lambda_1$;

$d_j$ indicates the thickness of the jth periodic structure having the period in the second direction;

$\Delta n'_i$ indicates the difference of the refractive index of the ith periodic structure, having the period in the first direction, for TE polarized light from that for TM polarized light with respect to designed wavelength $\lambda_2$; and $\Delta n'_j$ indicates the difference of the refractive index of the jth periodic structure, having the period in the second direction, for TE polarized light from that for TM polarized light with respect to designed wavelength $\lambda_2$.

Equation (4) can be obtained as follows.

First, when the differences in refractive index of a grating having thickness d for designed wavelengths $\lambda_1$ and $\lambda_2$ are represented by $\Delta n$ and $\Delta n'$, respectively, phase difference $\phi$ can be represented by equation (5) shown below.

$$\phi = 2\pi/\lambda_1 (\Delta nd) = 2\pi/\lambda_2 (\Delta n'd) \quad (\text{=Desired phase difference}) \qquad (5)$$

From the above equation, equation (6) is obtained.

$$\Delta nd/\lambda_1 = \Delta n'd/\lambda_2 \qquad (6)$$

Next, $\Delta nd$ for $\lambda_1$ and $\Delta n'd$ for $\lambda_2$ are calculated. Concerning $\lambda_1$, when a plurality of periodic structures (k periodic structures) having periods in the first direction exists, and the difference in refractive index of an ith periodic structure for TE polarized light from that of TM polarized light and the thickness of the ith periodic structure are represented by $\Delta n_i$ and $d_i$, respectively, the $\Delta nd(1)$, which is obtained by adding $\Delta nd$ of each periodic structure described above, can be represented by equation (7) shown below.

$$\Delta nd(1) = \Delta n_1 d_1 + \Delta n_2 d_2 + \ldots + \Delta n_i d_i + \ldots + \Delta n_k d_k \qquad (7)$$

$$= \sum_{i=1}^{k} \Delta n_i d_i$$

In a manner similar to that described above, when a plurality of periodic structures (l periodic structures) exists having periods in the second direction perpendicular to that of each of the periodic structure described above, and the difference in refractive index of a jth periodic structure for TE polarized light from that for TM polarized light and the thickness of the jth periodic structure are represented by $\Delta n_j$ and $d_j$, respectively, the $\Delta nd(2)$, which is obtained by adding $\Delta nd$ of each periodic structures described above, can be represented by equation (8) shown below.

$$\Delta nd(2) = \Delta n_1 d_1 + \Delta n_2 d_2 + \ldots + \Delta n_j d_j + \ldots + \Delta n_l d_l \qquad (8)$$

$$= \sum_{j=0}^{l} \Delta n_j d_j$$

In the above equation, when the periodic structure having periods in the second direction described above is not present (l=0), j=0 is satisfied.

When the first direction and the second direction are the same, $\Delta nd$ for $\lambda_1$ is represented by equation (7)+equation (8), that is, $\Delta nd = \Delta nd(1) + \Delta nd(2)$ holds. However, the first direction and the second direction are perpendicular to each other. Accordingly, when light having a polarization direction enters and passes as TE polarized light through a periodic structure having a period in the first direction and then enters a periodic structure having a period in the second direction, the polarized light becomes TM polarized light. That is the TE polarized light is converted into the TM polarized light. Hence, when equation (9) shown below is satisfied for light having a specific polarization direction in a periodic structure having a period in the first direction, and the light then enters a periodic structure having a period in the second direction, equation (10) shown below is satisfied.

$$\Delta n = n(TE) - n(TM) \qquad (9)$$

$$-n(TE) + n(TM) = -\Delta n \qquad (10)$$

Hence, $\Delta nd$ for $\lambda_1$ is practically represented by equation (7)−equation (8). As a result, equation (11) below holds.

$$\Delta nd = \sum_{i=1}^{k} \Delta n_i d_i - \sum_{j=0}^{l} \Delta n_j d_j \qquad (11)$$

In a manner similar to the above, $\Delta n'd$ for $\lambda_2$ is represented by equation (12) shown below.

$$\Delta n'd = \sum_{i=1}^{k} \Delta n'_i d_i - \sum_{j=0}^{l} \Delta n'_j d_j \qquad (12)$$

When equations (11) and (12) are substituted in equation (6), equation (13) is finally obtained.

$$\left( \sum_{i=1}^{k} \Delta n_i d_i - \sum_{j=0}^{l} \Delta n_j d_j \right) \Big/ \lambda_1 = \left( \sum_{i=1}^{k} \Delta n'_i d_i - \sum_{j=0}^{l} \Delta n'_j d_j \right) \Big/ \lambda_2 \qquad (13)$$

Next, various embodiments of the present invention will be described with reference to respective examples.

EXAMPLES

First Example

Figure 2:
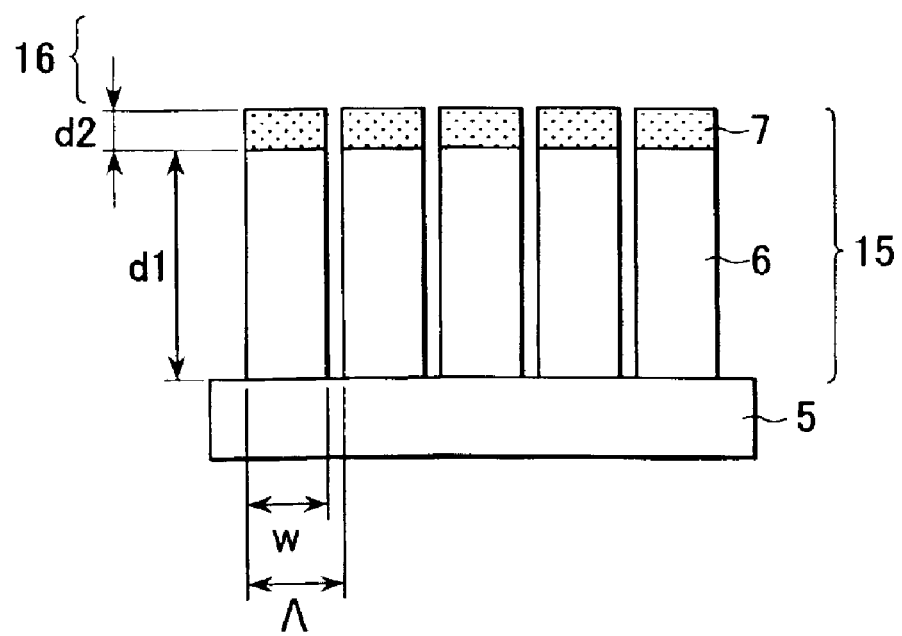
FIG. 2 is a cross-sectional view showing the phase plate of the first example according to the present invention.

FIG. 1 is a schematic view showing a phase plate according to a first example. An optical element of this example is a phase plate ($\lambda/4$ plate) having a minute periodic structure. FIG. 2 is a side cross-sectional view of the phase plate shown in FIG. 1. In FIG. 2, reference numeral 5 indicates a substrate, and reference numeral 15 indicates a one-dimensional grating 15 that is a minute periodic structure. The one-dimensional grating is formed of two periodic structures each having a period smaller than the wavelength of usable light. An incident side medium 16 is air. The two periodic structures forming the one-dimensional grating are formed of materials having different refractive indices and dispersibilities from each other. By way of example, the substrate is formed of $Ta_2O_5$, and a first periodic structure 6 (hereinafter referred to as "first grating 6") and a second periodic structure 7 (hereinafter referred to as "second grating 7") in that order from the substrate side are formed of $Ta_2O_5$ (refractive index n1 of 2.139) and $SiO_2$ (refractive index n2 of 1.8), respectively. Period $\Lambda$ of each of the first and the second gratings is 0.16 $\mu$m, thickness d1 of the first grating 6 is 0.39 $\mu$m, thickness d2 of the second gratings 7 is 0.10 $\mu$m, and filling factor FF ($=w/\Lambda$) is set to 0.85. The structure described above can be formed, for example, by etching. In this example, the structure having a grating period at which the grating behaves as a zero-order grating is formed so that high-order diffraction light other than zero-order diffraction light is not generated in the visible light region.

The conditions for the grating period, in which the grating behaves as a zero-order grating, are described in a technical paper (E. B. Grannetal, J. Opt. Soc. Am. AVol. 13, No. 5, pp. 988 to 992, 1996) and can be obtained by equation (14) shown below.

$$(\Lambda max)=(\lambda min)/(ns+ni|\sin \theta i|) \quad (14)$$

In the above equation, Λmax indicates the maximum value of a grating period at which the grating behaves as a zero-order grating, λmin indicates the minimum value of an incident wavelength, ns indicates the refractive index of one of grating materials, ni indicates the refractive index of the other grating material, and θi indicates an incident angle. When incident wavelength λmin is 0.40 μm, one grating material is $Ta_2O_5$ (ns of 2.139), the other grating material is air (ni of 1.000), and incident angle θi is zero, Λmax is approximately 0.187 μm, and hence it is understood that a grating having periods Λ1 and Λ2 of 0.16 μm behaves as a zero-order grating. In addition, by precisely performing calculation of light transmittance and reflectance using a rigorous-coupled wave analysis, which is a vector analysis, it is also confirmed that high-order diffraction light is not generated.

When a grating period is used in which high-order diffraction light other than zero-order diffraction light is generated, diffraction efficiency of the zero-order light is decreased, and hence the optical usage efficiency of the optical system is significantly decreased. In addition to that, it is estimated that high-order diffraction light generates ghost or flare, and that the optical performance is extremely degraded. Accordingly, a grating period at which the grating behaves as a zero-order grating is preferable. In this example, the phase plate is designed using an effective medium theory (EMT). In addition, by calculating the difference in refractive index Δn using n(TE) and n(TM), the initial design values are estimated. Since two types of gratings are used in this example, when the differences in refractive index between the first grating 6 and the second grating 7 are represented by Δn1 and Δn2, and the thicknesses thereof are represented by d1 and d2, respectively, a grating shape in which equation (15) shown below is approximately satisfied in the visible light region is used.

$$\Delta n1 \times d1 + \Delta n2 \times d2 = \lambda/4 \quad (15)$$

In this example, Δn1 is 0.284, and Δn2 is 0.147. Finally, the reflectance and light transmittance and the phase difference are precisely calculated by a vector analysis (rigorous-coupled wave analysis).

Figure 3:
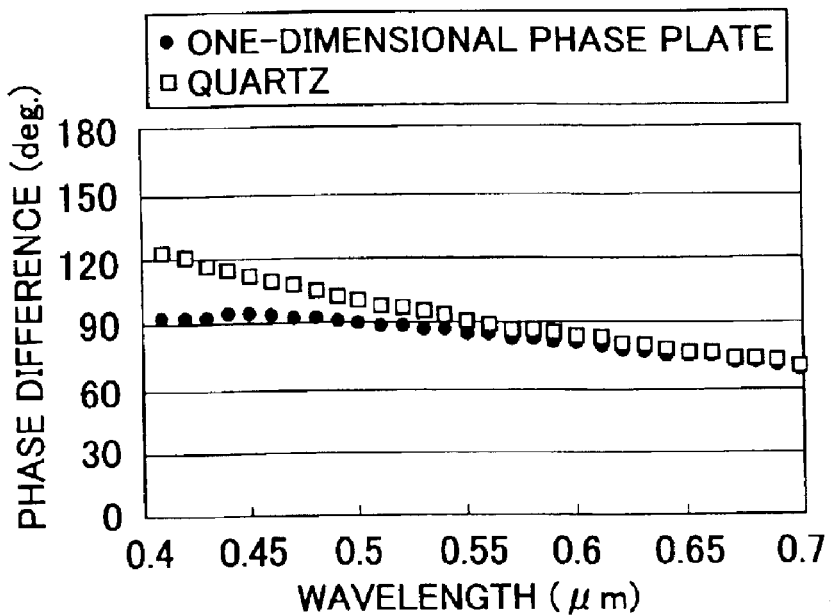
FIG. 3 is a graph showing phase difference characteristics of the phase plate of the first example according to the present invention.
Figure 4:
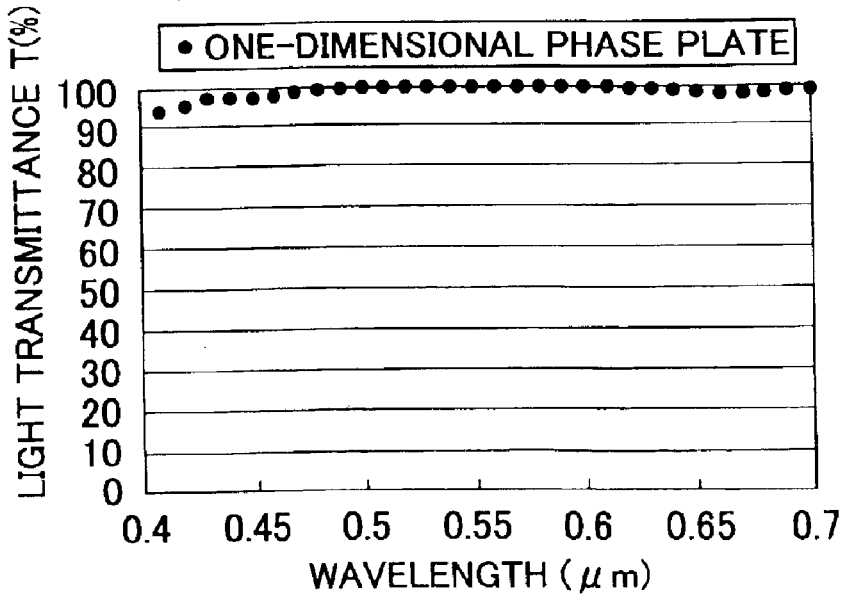
FIG. 4 is a graph showing light transmittance characteristics of the phase plate of the first example according to the present invention.

The phase-difference characteristics of the λ/4 plate of this example are shown in FIG. 3. In FIG. 3, the transverse axis represents the wavelength, and the vertical axis represents the phase difference. When being compared with the results of a conventional phase plate made of quartz, the slope of a line showing the phase difference is gentle and becomes flat in a short wavelength region of 0.50 μm or less, and hence the wavelength dependence of the phase difference is reduced. In addition, the light transmittance characteristics of the phase plate of this example are shown in FIG. 4. In this figure, the transverse axis represents the wavelength, and the vertical axis represents the light transmittance. Although the light transmittance of the conventional phase plate made of quartz is approximately 95%, the light transmittance of the phase plate of this example is 97% or more approximately in the entire visible light region, and hence it is understood that superior transmission characteristics can be realized. Furthermore, since the phase difference can be controlled by using the refractive indices of grating materials, grating periods, grating thicknesses, and filling factors as parameters, phase plates having various properties can be designed.

In this example, $Ta_2O_5$ and $SiO_2$, which transmits the light of the wavelength region of from 400 to 700 nm, are used as the grating materials; however, the grating materials are not limited thereto, and as long as materials having refractive indices and dispersibilities different from each other are used, problems hardly occur. In addition, the material for the grating (second grating 7 in the first example) located at the position nearest to air, which is the incident side medium, has a low refractive index as compared to that of the other material for the grating (first grating 6 in the first example). Furthermore, as long as primary functions and performances are satisfied, materials having various refractive indices may be optionally combined with each other (combination of a materials having a high refractive index and a material having a low refractive index). Related to this, in order to realize a large structural birefringence, the difference in refractive index is necessary to be large, and when air is used as a low refractive index material, the largest structural birefringence can be obtained.

In addition, as in the case of the first grating 6 and the second grating 7 in the first example, the entire grating is composed of a plurality of materials. In the first example, the first grating 6 and the second grating are formed of the two types of materials in the first example; however, in addition to the structure described above, by using at least three types of materials, a minute periodic structure may be formed having at least three gratings, such as a first grating, a second grating, a third grating, and so on.

Second Example

Next, a second example of the present invention will be described.

Figure 5:
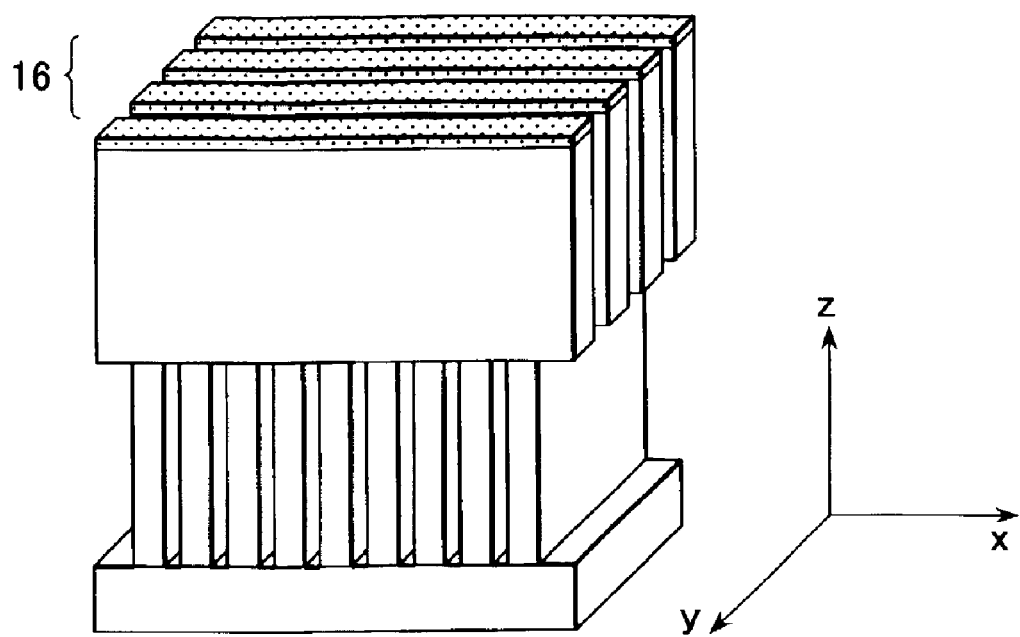
FIG. 5 is a schematic view showing a phase plate of a second example according to the present invention.
Figure 6:
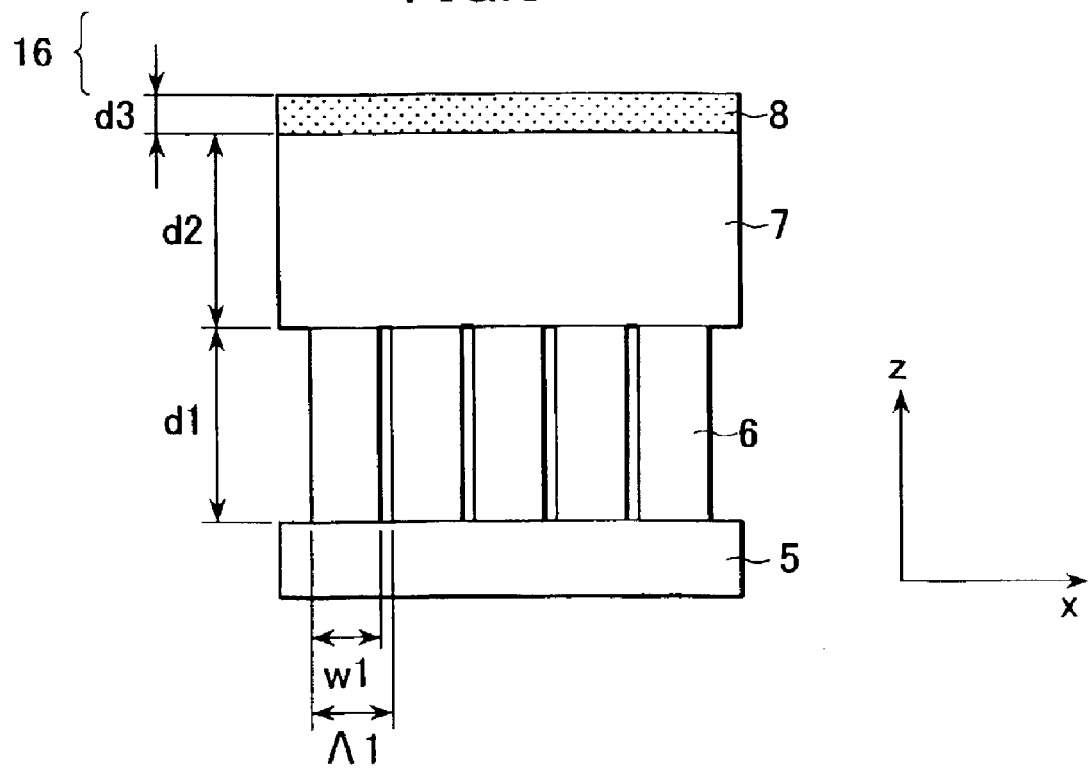
FIG. 6 is an x-z plan cross-sectional view showing the phase plate of the second example according to the present invention.
Figure 7:
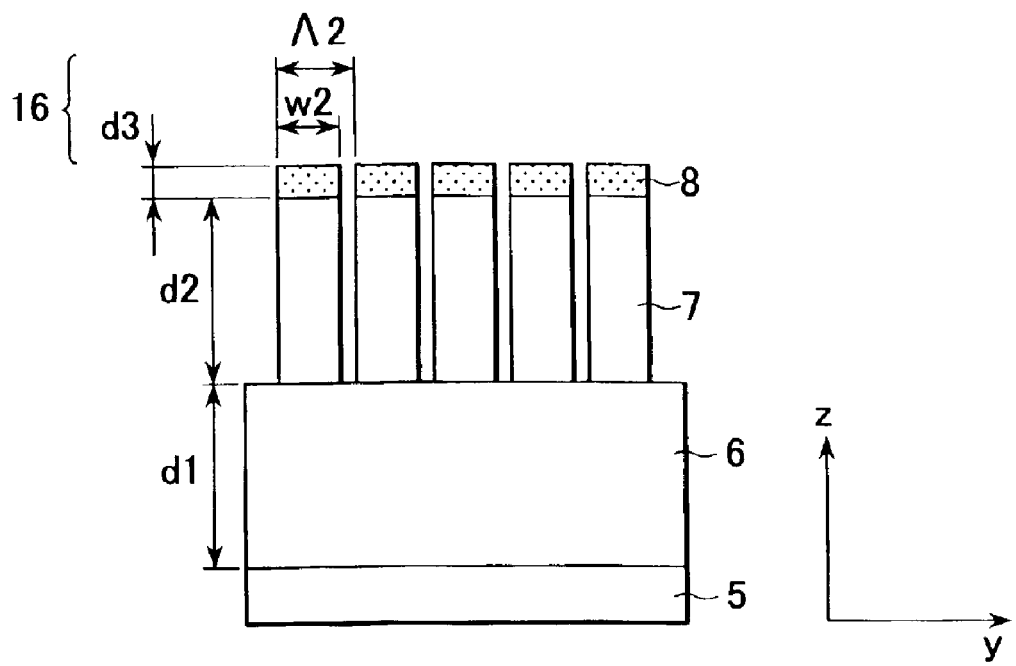
FIG. 7 is a y-z plan cross-sectional view showing the phase plate of the second example according to the present invention.

FIG. 5 is a schematic view showing a phase plate of the second example, FIG. 6 is an x-z plan cross-sectional view of the phase plate in FIG. 5, and FIG. 7 is a y-z plan cross-sectional view of the phase plate in FIG. 5.

Since being shown by a schematic view which is enlarged in the lateral direction, the phase plate shown in FIGS. 5, 6, and 7, may be different from the actual shape. In the second example shown in FIG. 5, a phase plate (λ/4 plate) is composed of three gratings. In this second example, the periodic direction of the first grating 6 is perpendicular to those of the second grating 7 and a third grating 8. Hereinafter, a phase plate having the structure as described above is called a multilayer type phase plate. In this example, a multilayer type λ/4 plate is formed. In this example, the substrate 5 is formed of $Ta_2O_5$, and air is used as the incident side medium 16. A material forming the first grating 6 located nearest to the substrate is composed of $TiO_2$, grating period Λ1 is set to 0.15 μm, grating depth d1 is set to 1.85 μm, and filling factor FF1 (=w1/Λ1) is set to 0.90. A material forming the second grating 7 located at a second stage is composed of $TiO_2$, and a material forming the third grating 8 located at a third stage is composed of $SiO_2$. In addition, grating period Λ2 and filling factor FF2 (=w2/Λ2) of each of the second and third gratings 7 and 8 are set to 0.15 μm and 0.82, respectively. Furthermore, grating depth d2 of the second grating 7 is set to 1.75 μm, and grating depth d3 of the third grating 8 is set to 0.10 μm. Grating periods Λ1 and Λ2 are grating periods so that the gratings behave as zero-order gratings in the visible light region.

In this example, as a designing method, the effective refractive indices of the individual gratings are calculated using EMT. First, in the first grating 6 at the first stage, the refractive index difference Δn1 between the refractive index of ordinary light and that of extraordinary light is obtained by equation (16) shown below.

$$\Delta n1 = n1(TE) - n1(TM) \tag{16}$$

In a manner as described above, the refractive index difference Δn2 of $TiO_2$ of the second grating 7 and the refractive index difference Δn3 of $SiO_2$ of the third grating 8 are obtained by equations (17) and (18) shown below, respectively.

$$\Delta n2 = n2(TE) - n2(TM) \tag{17}$$

$$\Delta n3 = n3(TE) - n3(TM) \tag{18}$$

In this case, since the periodic direction of the first grating is perpendicular to those of the second and the third gratings, it must be clearly understood that the TE polarized light in the grating structure of the first grating 6 is TM polarized light in the grating structure of each of the secondhand third gratings 7 and 8, and TM polarized light in the grating structure of the first grating 6 is TE polarized light of the grating structure of each of the second and third gratings 7 and 8. The difference in refractive index thus described corresponds to the difference between a positive crystal and a negative crystal of an anisotropic structure.

Accordingly, solutions, which can satisfy equation (19) shown below in the visible light region, are calculated using equation (4), and finally, the light reflectance and transmittance and the phase difference are precisely calculated by a rigorous-coupled wave analysis, which is a vector analysis.

$$\Delta n1 \times d1 - \Delta n2 \times d2 - \Delta n3 \times d3 = \lambda/4 \tag{19}$$

Figure 8:
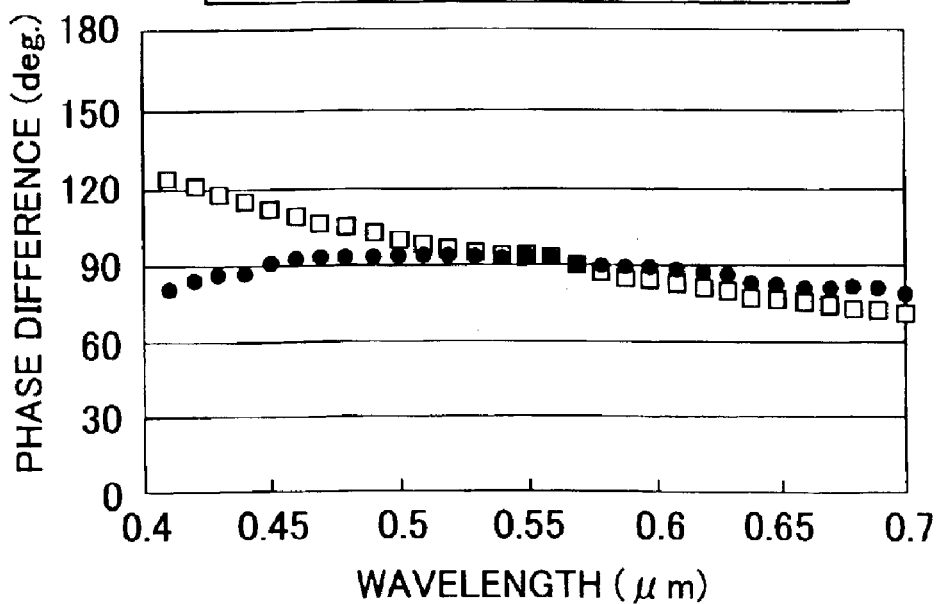
FIG. 8 is a graph showing phase difference characteristics of the phase plate of the second example according to the present invention.
Figure 9:
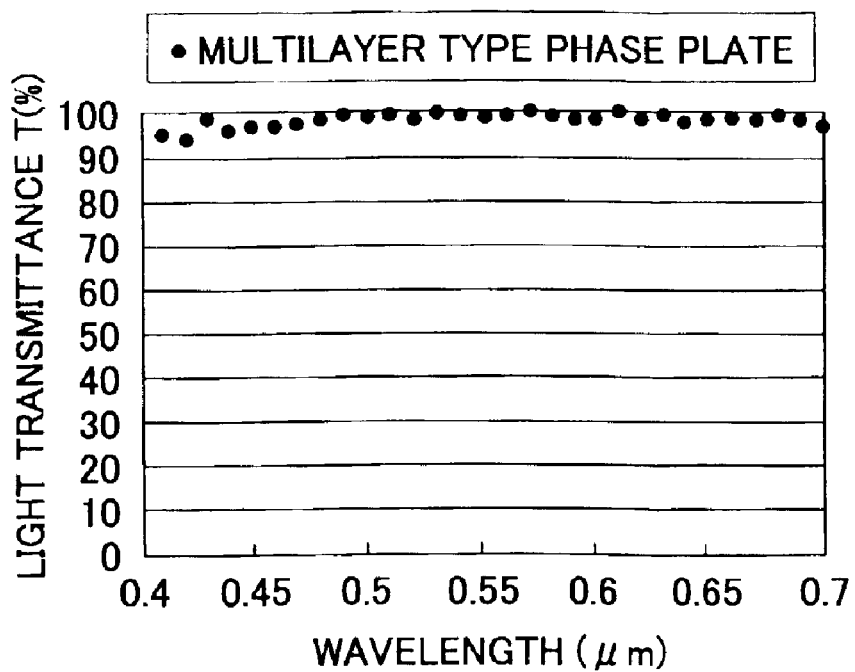
FIG. 9 is a graph showing light transmittance characteristics of the phase plate of the second example according to the present invention.

The phase difference characteristics of the multilayer type λ/4 plate of the second example are shown in FIG. 8. In FIG. 8, the transverse axis represents the wavelength, and the vertical axis represents the phase difference. As compared to the results of a conventional λ/4 plate made of a quartz crystal plate, the wavelength region in which the phase difference of the multilayer type λ/4 plate is approximately 90° is broad, and the wavelength dependence is reduced. In addition, the light transmittance characteristics of the phase plate of this example are shown in FIG. 9. In this figure, the transverse axis represents the wavelength, and the vertical axis represents the light transmittance. The light transmittance of the phase plate of this example is 96% or more approximately in the entire visible light region, that is, superior transmission characteristics can be realized. Furthermore, since the phase difference can be controlled by using the refractive indices of grating materials, grating periods, grating thicknesses, and filling factors as parameters, phase plates having various properties can be designed.

In the second example, two types of materials, i.e., $TiO_2$ and $SiO_2$, which transmits the light of the wavelength region of from 400 to 700 nm, are used as the grating materials; however, the grating materials are not limited thereto, and as long as materials having refractive indices and dispersibilities different from each other are used, problems hardly occur. In addition, in this example, as the materials for both the first and the second gratings 6 and 7, $TiO_2$ is used; however, the material is not limited thereto, and as the materials for the first and the second gratings 6 and 7, a grating material other than $TiO_2$ may be used, or materials having reflective indices different from each other may also be used. Furthermore, the material for the grating (third grating 8 in the second example) located at the position nearest to air 16, which is the incident side medium, has a low refractive index as compared to that of each of the other materials for the gratings (first grating and the second gratings in the second example). As long as primary functions and performances are satisfied, materials having various refractive indices may be optionally combined with each other (combination of a materials having a high refractive index and a material having a low refractive index).

Figure 10:
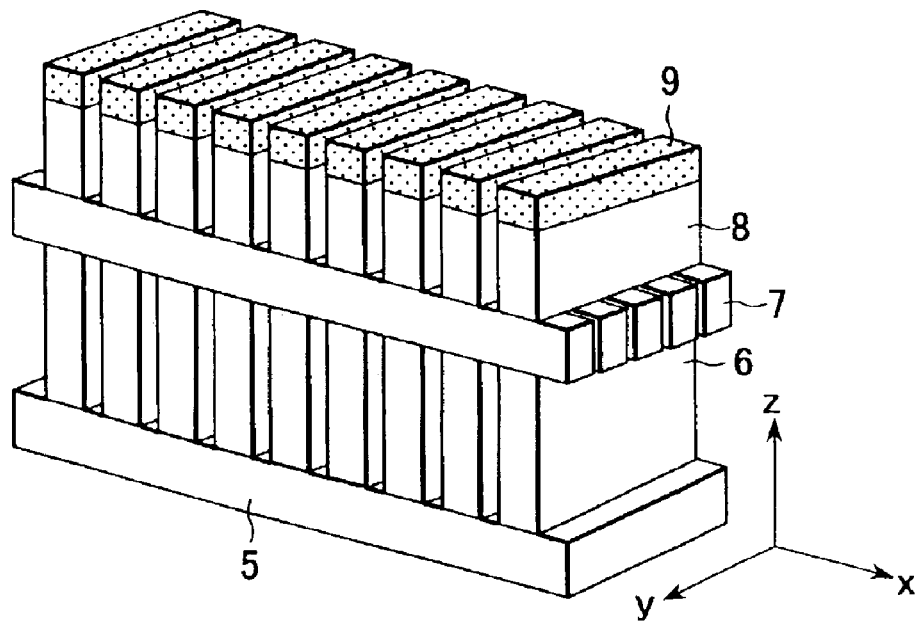
FIG. 10 is a schematic view showing a phase plate of a modified second example according to the present invention.

Related to this, a modified example of the second example is shown in FIG. 10. FIG. 10 is a schematic perspective view showing a phase plate according to the modified example composed of the first grating 6, the second grating 7, the third grating 8, and a fourth grating 9 provided on the substrate in that order therefrom. As in this modified example, four types of gratings may be laminated to each other and provided on the substrate to form a phase plate. In this example, the substrate and the first to the third gratings are formed of $TiO_2$, and the fourth grating is formed of $SiO_2$. However, the first to the third gratings may be formed of materials different from each other. In addition, the filling factors of the first to the third gratings may be the same or different.

Third Example

As a third example of the present invention, a λ/2 plate for use in a polarization conversion device will be described by way of example. In polarization conversion devices mounted in liquid crystal projectors or the like, by using a polarization beam splitter, non-polarized white light emitted from a light source is converted into two types of linear polarized light having polarization directions different from each other by 90°. In this step, in order to increase the optical usage efficiency, the polarization direction of one type of linear polarized light thus converted is rotated by 90° so as to be the same as that of the other type of linear polarized light, and hence the two types of linear polarized light described above are emitted in the same direction. For rotating the polarization direction by 90°, a λ/2 plate is used. However, in a conventional λ/2 plate, the difference in refractive index has wavelength dependence.

Figure 11:
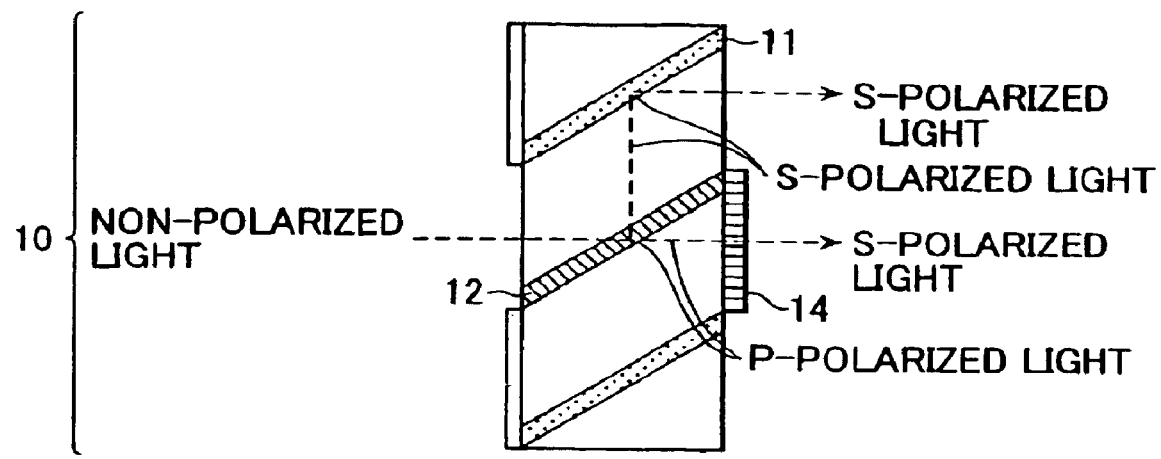
FIG. 11 is a schematic view showing a polarization conversion device of a third example according to the present invention.

FIG. 11 shows the case in which the λ/2 plate 14 of this example is used for a polarization conversion device. The non-polarized white light emitted from the light source is incident on a polarization beam splitter 12 and is then separated into p-polarized light which passed through the polarization beam splitter and s-polarized light which was reflected therefrom. Of the two types of polarized light thus separated, the p-polarized light is turned into s-polarized light after passing through the λ/2 plate 14 and is then emitted to the same direction as that of the s-polarized light which was reflected from the polarization beam splitter and a mirror 11. Compared to a conventional λ/2 plate, an optical system can be realized in which the phase difference has less wavelength dependence, and high optical usage efficiency can also be obtained at wavelengths other than the designed wavelength. Accordingly, since the brightness and image quality can be improved, a liquid crystal projector provided with high performance can be realized as compared to that in the past. In addition, since dielectric materials such as $TiO_2$ may be used for forming the phase plate, the changes in volume or refractive index caused by heat can be suppressed, and as a result, stable performances can be advantageously obtained. Thinner devices can also be realized by using a large amount of the structural birefringence. Furthermore, since the phase difference can be controlled by using the refractive indices of grating materials, grating periods, grating thicknesses, and filling factors as parameters, phase plates having various properties can be designed, and hence optimum performances can be realized in accordance with applications.

In addition, the applications of the phase plate of this first example are not limited to polarization conversion devices, and the phase plate of this example may be applied, for example, to liquid crystal projectors (image display apparatuses) having the polarization conversion device of the third example or to image display systems including liquid crystal projectors and image transmission means (televisions, personal computers, digital cameras, and the like) for transmitting image information thereto. In addition, the phase plate of this example may also be applied to various optical apparatuses and devices incorporating $\lambda/2$ plates, $\lambda/4$ plates, and the like.

In this example, as the grating structure (minute periodic structure), the structure in which a grating material and air are alternately disposed in the periodic direction; however, the present invention is not limited thereto, and a first grating material and a second grating material other than air may be alternately disposed to form a grating.

Fourth Example

Next, a fourth example of the present invention will be described.

Figure 12:
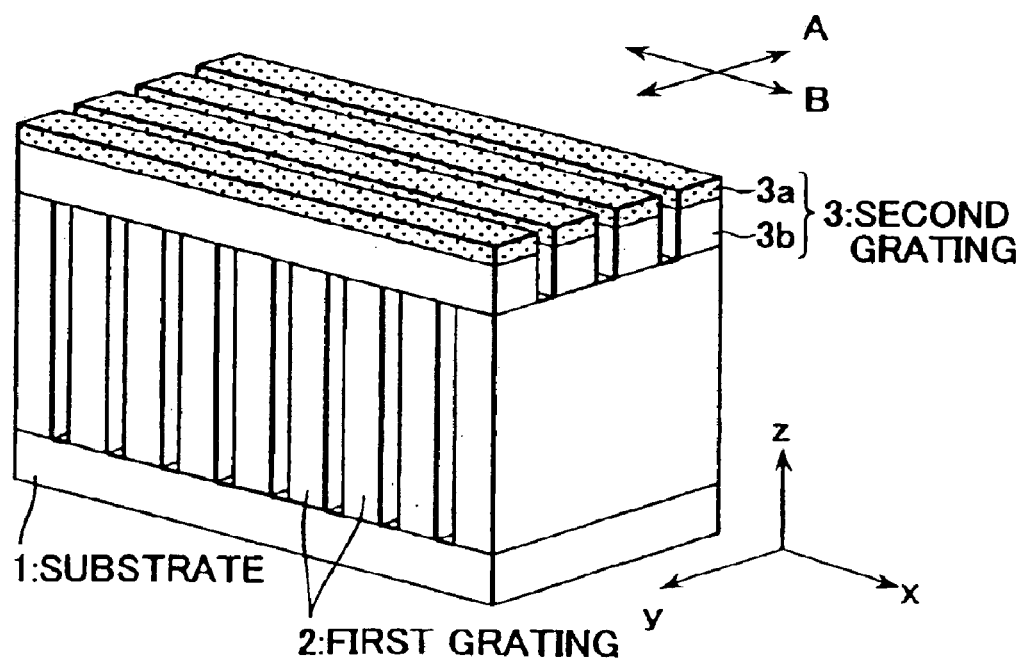
FIG. 12 is a schematic view showing a phase plate of a fourth example according to the present invention.
Figure 13:
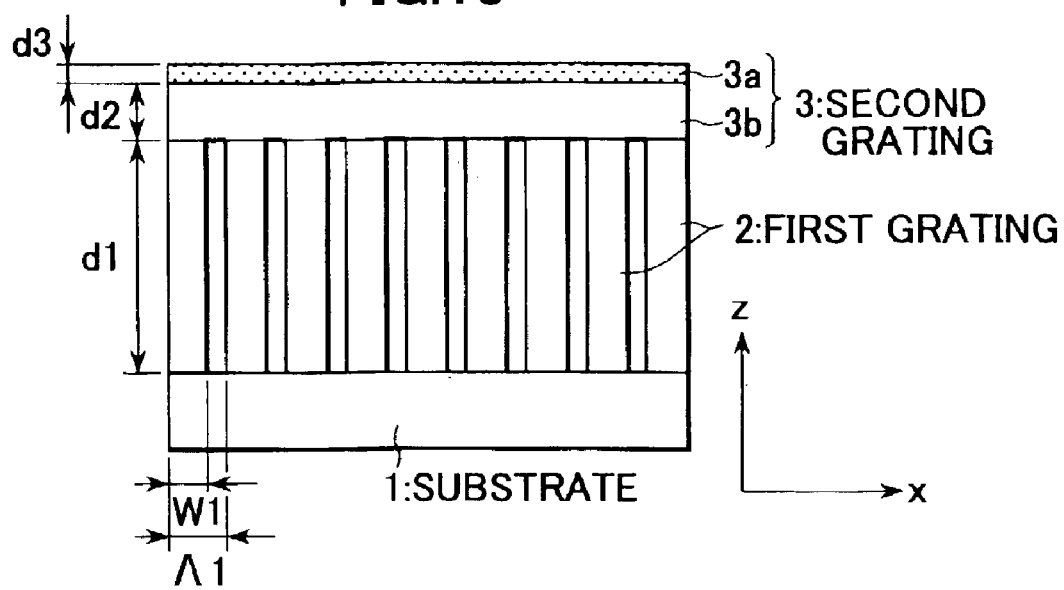
FIG. 13 is an x-z plan cross-sectional view of the phase plate shown in FIG. 12.
Figure 14:
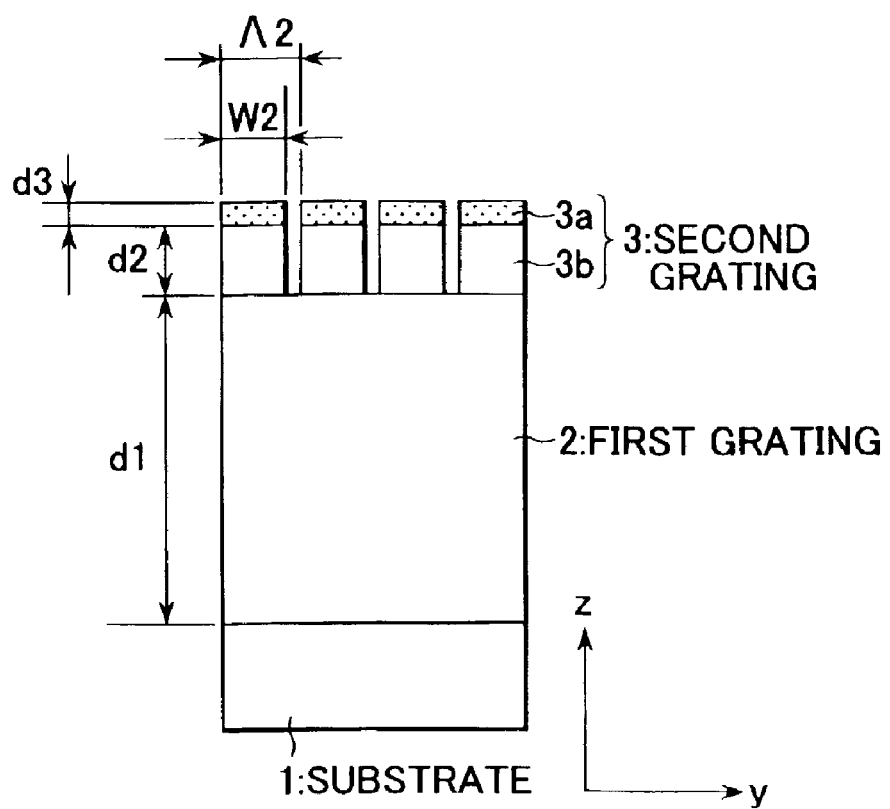
FIG. 14 is a y-z plan cross-sectional view of the phase plate shown in FIG. 12.

FIG. 12 is a perspective view showing the structure of a multilayer type phase plate according to the fourth example, FIG. 13 is an x-z plan cross-sectional view of the phase plate in FIG. 12, and FIG. 14 is a y-z plan cross-sectional view of the phase plate in FIG. 12. In the figures, reference numeral 1 indicates a substrate, and reference numeral 2 indicates a first grating having a predetermined period in one-dimensional manner and disposed on the substrate. In addition, reference numeral 3 indicates a second grating having a predetermined period in the direction perpendicular to the periodic direction of the first grating 2. The second grating 3 is formed of gratings 3a and 3b laminated to each other and having refractive indices different from each other (in this example, these two gratings 3a and 3b are collectively treated as one grating and are referred as "second grating"). The two one-dimensional gratings, that is, the first and the second gratings 2 and 3, each have the structure in which a high refractive index material (grating portions) and a low refractive index material (air) are alternately disposed. In addition, the periods of the first grating and the second grating are each formed to be smaller than the wavelength of usable light (in this example, visible light). Related to this, air is used as an incident side medium; however, a cover made of glass or the like may be used instead.

In addition, the width, depth (thickness), and grating period of the first grating are represented by W1, d1, and $\Lambda 1$, respectively. The width and grating period of the second grating are represented by W2 and $\Lambda 2$, respectively. The depths (thicknesses) of the grating 3a and 3b of the second grating 3 are represented by d3 and d4, respectively.

In this example, a $\lambda/4$ plate formed by laminating two one-dimensional gratings to each other is shown, and in addition, the periodic directions of the first grating 2 and the second grating 3 are perpendicular to each other. Hereinafter, in this example, this structure is called a two-stage multilayer type $\lambda/4$ plate. As an example of this two-stage multilayer type $\lambda/4$ plate, $SiO_2$ and $Ta_2O_5$ are used for the grating 3a and 3b, respectively, as two types materials forming the second grating 3, and $Ta_2O_5$ is used as a material for forming the first grating 2. Grating periods $\Lambda 1$ and $\Lambda 2$ are each set to 0.16 $\mu$m so that high-order diffraction light other than zero-order diffraction light is not generated in the visible light region, that is, are each set so that the gratings behave as zero-order gratings.

In this example, since the periodic direction of the first grating 2 and that of the second grating 3 are perpendicular to each other, the refractive index difference of the first grating 2 and that of the second grating 3 are represented by $\Delta n1$ and $\Delta n2$, respectively.

As a result, in the case of $\Delta/4$, equation (20) shown below is used in which solutions are obtained at two wavelengths in the visible light region.

$$\Delta n1 \times d1 - \Delta n2 \times d2 - \Delta n3 \times d3 = \lambda/4 \tag{20}$$

In this example, the number of solutions which can satisfy equation (20) at two wavelengths is infinite; however, from a point of element production, filling factor FF and the grating depth preferably have appropriate values. In general, when filling factor FF is extremely small, and the grating depth is large, the grating structure is likely to collapse, and hence manufacturing cannot be easily performed. As a result, a filling factor in the range of from 0.20 to 0.95 is preferable.

In addition, in this example, it is preferable that available filling factor FF1 of the first grating 2 be in the range of approximately 0.75 to 0.90 and that available filling factor FF2 of the second grating 3 be in the range of approximately 0.30 to 0.70. As particular values by way of example, in order to satisfy phase difference $\lambda/4$, when FF1 is 0.81, and FF2 is 0.60, thicknesses d1, d2, and d3 must be approximately 1.07, 0.31, and 0.10 $\mu$m, respectively, as the grating depths. Even when the values are not in the ranges described above, phase difference $\lambda/4$ may be realized in some cases, that is, as long as basic performance can be satisfied, values larger or smaller than those described above may also be used.

Next, an example will be described in which the phase difference conditions shown by equation (20) can be satisfied, and the reflectance of an element can be decreased. An object of this example is to satisfy phase difference $\lambda/4$, and in addition, to realize a phase plate which can decrease the reflectance for each polarization direction of incident light. The grating structure is a two-stage multilayer type $\lambda/4$ plate. In this structure, $SiO_2$ and $Ta_2O_5$ are used as grating materials, grating periods $\Lambda 1$ and $\Lambda 2$ are each set to 0.16 $\mu$m, and filling factors FF1 and FF2 and grating depths d1, d2, and d3 are used as parameters.

According to the two-stage multilayer type $\lambda/4$ plate of this example, with respect to one polarization direction, the refractive index profile is such that the effective refractive index is gradually increased from the incident side medium to the substrate 1, and with respect to the other polarization direction, the difference in refractive index between the first grating and the second grating laminated thereto is decreased.

In the case described above, for example, filling factors FF1 and FF2 are set to 0.81 and 0.60, respectively. Although the number of combinations of filling factors is infinite, in consideration of easier production, it is preferable that the two grating depths be not excessively large. The grating depths can be calculated using equations (3) to (6) and the effective refractive indices obtained from FF1 and FF2. In this example, as the structure in which the grating depths are not excessively large, it is preferable that FF1 be in the range of approximately 0.75 to 0.90, and that FF2 be in the range of 0.30 to 0.70.

Figures 15, 16:
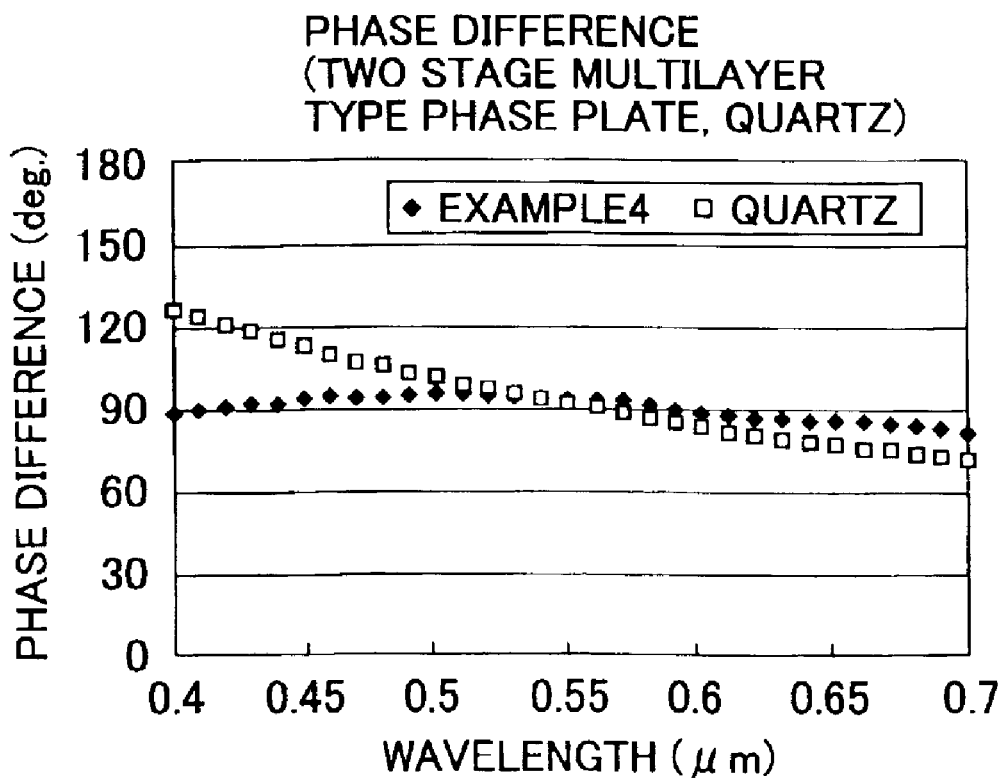
FIG. 15 is a table showing effective refractive indices of grating materials in the fourth example for the TE mode polarized light and TM mode polarized light.
FIG. 16 is a view showing phase difference characteristics of the phase plate of the fourth example together with those of quartz for the sake of comparison.

The effective refractive indices for the polarized light are shown in FIG. 15. In this example, in consideration of the case in which TE polarized light and TM polarized light are converted to each other between the gratings provided perpendicular to each other, in order to avoid the confusion, the direction perpendicular to the period of the first grating 2 is represented by direction A, and the direction parallel to the period of the first grating 2 is represented by direction B. In addition, the effective refractive index of the polarized light of each grating in direction A is represented by n(A), and the effective refractive index of the polarized light of each grating in direction B is represented by n(B). That is, in the first grating 2, n(A)=n(TE) is satisfied, and on the other hand, in the second grating 3, n(A)=n(TM) is satisfied (see FIG. 12). In addition, in FIG. 15, $n_i$, n1, n2, n3, and ns indicate the refractive indices of the incident side medium (air in this example), the first grating 2, the grating 3b of the second grating 3, the grating 3a of the second grating 3, and the substrate, respectively.

First, concerning n(A), the individual effective refractive indices ($\lambda 0$=d line) calculated in accordance with EMT are as follows.
ni(A)=1 (air),
n3(A)=1.230,
n2(A)=1.436,
n1(A)=1.993
ns=2.139
As can been seen from these results, the refractive indices are gradually increased from the light incident side to the substrate side. According to this refractive index profile, the Fresnel reflection on the surface of the substrate is decreased, and an antireflection effect can be obtained in a broad region. This effect is similar to, for example, an antireflection effect obtained by a refractive index profile of a gradient film in which the refractive index thereof is gradually changed.

Next, concerning n(B), the individual effective refractive indices calculated in accordance with EMT are as follows.
ni(B)=1 (air),
n3(B)=1.313,
n2(B)=1.823,
n1(B)=1.733
ns=2.139
As can been seen from these results, the difference in refractive index between n1(B) and n2(B) (that is, the difference in refractive index between gratings) is small. In this case, the difference between n1(B) and n2(B) is 0.09, that is, they are approximately equivalent to each other. In addition, the difference in refractive index is not necessary to be exactly zero, and as a rough targeted value, the difference in refractive index is preferably in the range of from approximately 0.1 to 0.2. As described above, as for the TM polarized light, the difference in refractive index between gratings laminated to each other is smaller than that of the TE polarized light. In addition, when n1(B) and n2(B), having a small difference therebetween, are considered to be approximately equal to each other, the Fresnel reflection generated between the first grating 2 and the second grating 3 can be reduced. Furthermore, since the refractive index profile is obtained in which ni(B)<n3(B)<n2(B) n1(B)<ns (B) is satisfied, as described above, an antireflection effect can be obtained.

When an optical thickness of the grating 3a of the second grating 3 is optimally designed, an antireflection effect can be further obtained. In particular, when thickness d3 of the grating 3a of the second grating 3 is formed to have an optical thickness approximately equivalent to one fourth of a designed wavelength, an antireflection effect for the TM polarized light can be obtained. However, since thickness d3 of the grating 3a also has an influence on the reflectance of the TE polarized light, in practice, it is important that the thickness be designed to have a reflectance suitably for both TE polarized light and TM polarized light, and as a rough targeted value for designing, the thickness is preferably about one fourth of a designed wavelength.

In addition, even when the tendency of the effective refractive indices for the TE polarized light and the TM polarized light is opposite to that described above, the same effect as described above can be obtained. That is, when the difference in effective refractive index is small with respect to the TE polarized light, and with respect to the TM polarized light, when the effective refractive index is gradually increased from the incident side medium to the substrate side, the same effect as described above can be obtained.

Furthermore, since being controlled by grating period $\Lambda$ and filling factor FF of the grating, the effective refractive indices can be controlled to some extent regardless of the refractive indices of grating materials. Accordingly, in order to realize the effective refractive indices described above, the order of lamination of grating materials is not always necessarily limited.

When the difference between refractive index ns of the substrate material and effective refractive index n1(TE) (or n1(TM)) of the grating on the substrate is large, the Fresnel reflection is generated at the interface therebetween, and as a result, the reflectance is increased. Hence, the difference in refractive index between ns and n1(TE) (or n1(TM)) is preferably small. However, since the refractive index has anisotropy in a one-dimensional grating, n1(TE) and n1(TM) cannot be equivalent to each other from a theoretical point of view. Accordingly, the difference in refractive index in TE direction, i.e., ns−n1(TE), and the difference in refractive index in TM direction, i.e., ns−n1(TM) cannot be zero at the same time. As a result, in order to obtain an antireflection effect for both directions of TE and TM polarized light, the difference in refractive index in TE direction, i.e., ns−n1(TE), and the difference in refractive index in TM direction, i.e., ns−n1(TM) are both preferably set to be small.

Next, the grating depth will be described. As for the phase difference, the depth must be set so that phase difference And satisfies $\lambda/4$; however, at the same time, the grating depth must have an antireflection effect. In order to obtain an antireflection effect, in general, designing is preferably performed so that film thickness nd is integral multiples of $\lambda 0/4$ in which $\lambda 0$ is a wavelength.

When grating shapes, which have antireflection effects independent of polarization directions, are calculated based on initial conditions obtained from the phase different conditions using the method described above, the following results are obtained. That is, for example, in the case of two-stage multilayer type $\lambda/4$ plate, $SiO_2$ and $Ta_2O_5$ are used as materials for the grating 3a and 3b, respectively, of the second grating 3; grating period $\Lambda 2$ is 0.16 $\mu$m; grating depth d3 is 0.10 $\mu$m; grating depth d2 is 0.24 $\mu$m; and filling factor FF2 (=w2/$\Lambda 2$) is 0.60. In addition, $Ta_2O_5$ is used as a grating material for the first grating 2; grating period $\Lambda 1$ is 0.16 $\mu$m; grating depth d1 is 0.96 $\mu$m; and filling factor FF1 (=w1/$\Lambda 1$) is 0.81. Grating periods $\Lambda 1$ and $\Lambda 2$ are formed so that high-order diffraction light other than zero-order light is not generated in the visible light region, that is, are formed that the gratings behave as zero-order gratings.

In FIG. 16, the phase difference characteristics of the two-stage multilayer type $\lambda/4$ plate according to the fourth example are shown. In FIG. 16, the phase difference characteristics of quartz are also shown. The transverse axis represents the wavelength, and the vertical axis represents the phase difference. Compared to the results of the conventional λ/4 plate made of quartz, in the tow stage multilayer type λ/4 plate, the wavelength region at a phase difference of 90° is broad. In addition, the error span is decreased to approximately −5° to +10° with respect to 90°, and as a result, the wavelength dependence is remarkably reduced.

Figure 17:
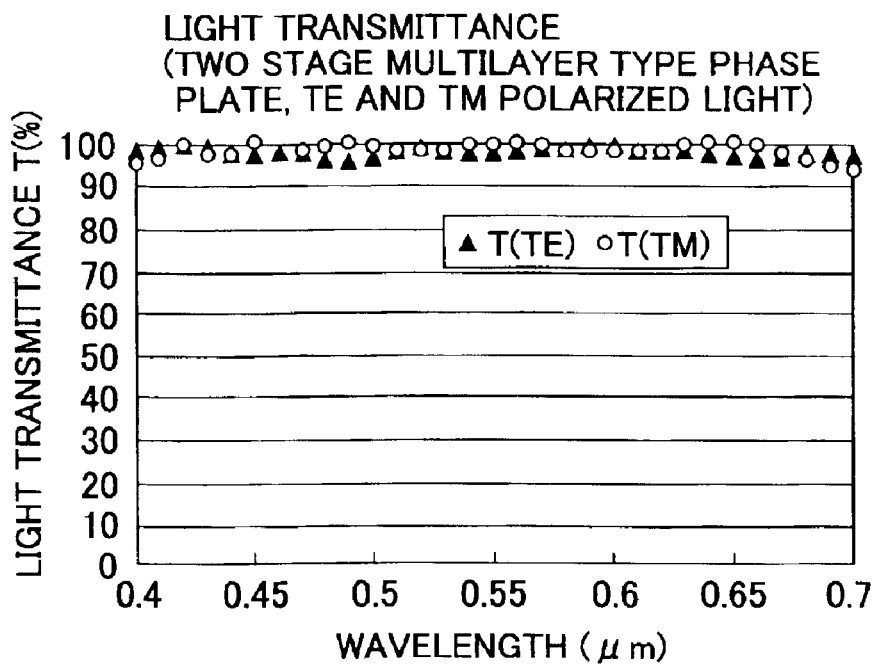
FIG. 17 is a view showing light transmittance characteristics of the phase plate in the fourth example for the TE mode polarized light and TM mode polarized light.
Figure 18:
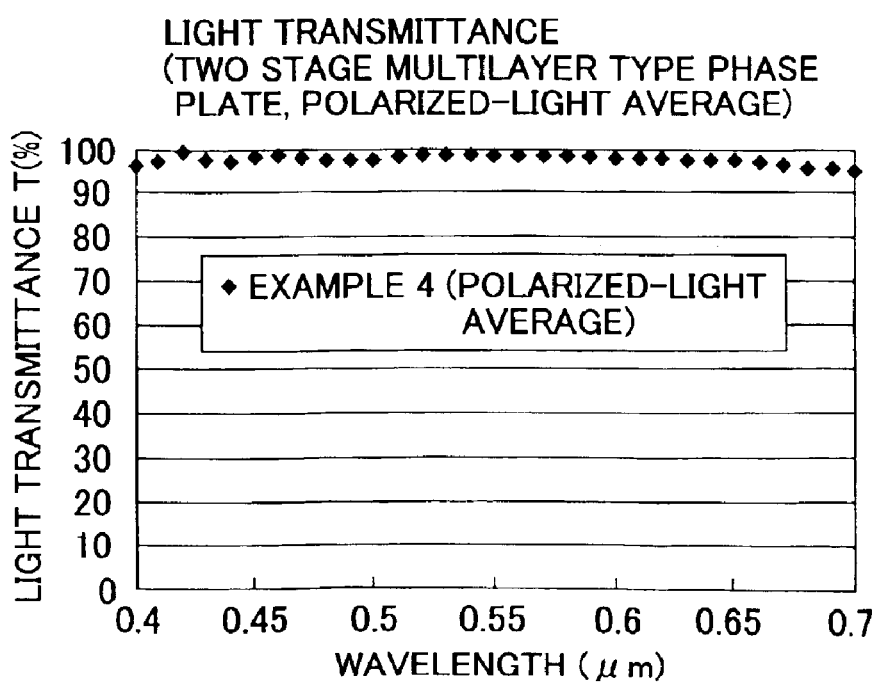
FIG. 18 is a view showing the average light transmittance of the phase plate in the fourth example for the TE mode polarized light and TM mode polarized light.

In addition, FIGS. 17 and 18 show the light transmittance characteristics. In this step, by a rigorous-coupled wave analysis, which is a vector analysis, the light reflectance and transmittance, and the phase difference are precisely calculated. In FIG. 17, the light transmittance characteristics for the TE polarized light and the TM polarized light are shown. The transverse and vertical axes represent the wavelength and the light transmittance, respectively, and from this figure, it can be understood that superior light transmittance characteristics for both the TE polarized light and the TM polarized light are obtained. In addition, in FIG. 18, the average of light transmittance, which is obtained from those in respective polarization directions, is shown. As can be seen from FIG. 18, a high light transmittance of approximately 97% or more can be obtained approximately over the entire visible light region, and hence superior performance can be realized.

In this example, the λ/4 plate is described by way of example; however, the present invention is not limited thereto. Since the phase difference can be controlled by the refractive indices of grating materials, grating periods, grating depths, and filling factors as parameters, and in addition, an antireflection effect can also be obtained, the present invention can be applied to various phase plates such as λ/4 plate.

In this example, as the two materials for the second grating 3, $Ta_2O_5$ and $SiO_2$ are used; however, the present invention is not limited thereto, and as long as at least two types of grating materials having refractive indices and dispersibilities different from each other are used, problems hardly occur. In addition, in this example, as the material for the first grating 2 and the grating 3b of the second grating 3, $Ta_2O_5$ is used; however, the present invention is not limited thereto, materials other than $Ta_2O_5$ may be used, and materials having different refractive indices from each other may also be used for the first grating 2 and the grating 3b of the second grating 3. In addition, as long as primary functions and performances are satisfied, as the materials for the first grading 2 and the gratings 3a and 3b of the second grating 3, any materials having refractive indices different from each other may be used in combination. Furthermore, the entire second grating 3 is preferably formed of various materials, and in this example, the second grating 3 is formed of two types of materials; however, at least three types of materials may also be used.

Fifth Example

Figure 19:
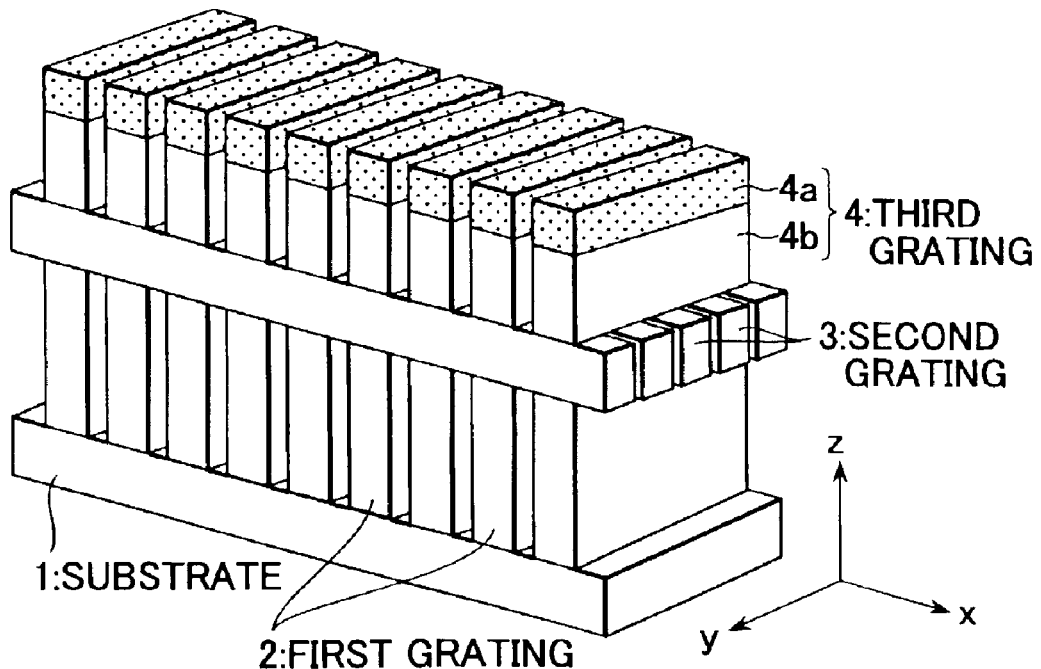
FIG. 19 is a perspective view of a phase plate of a fifth example.
Figure 20:
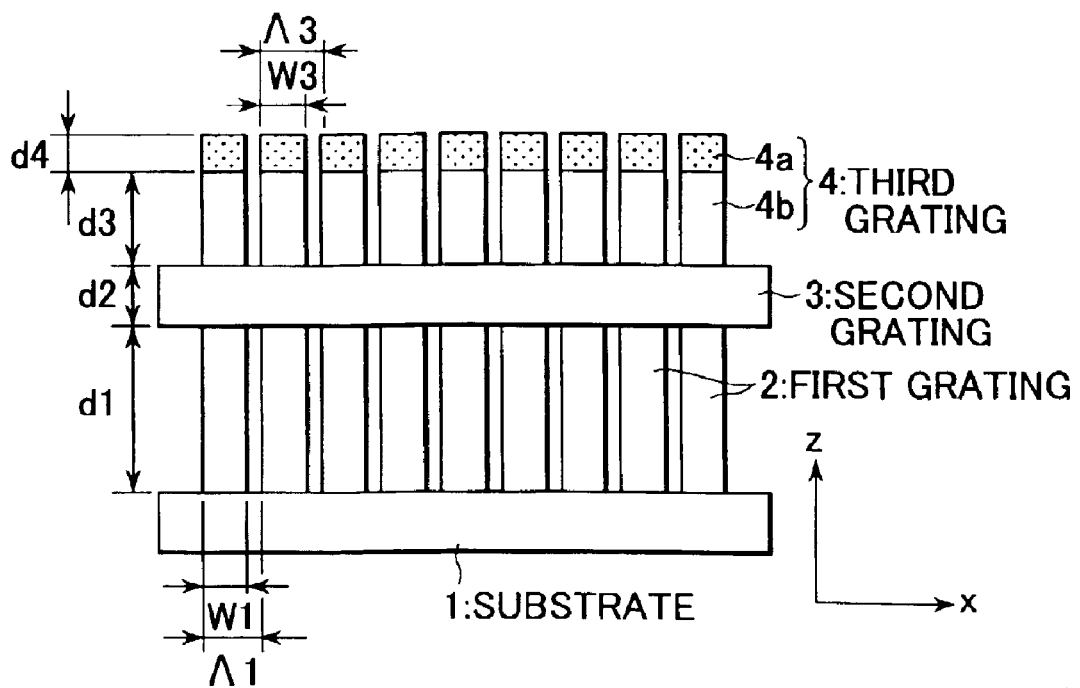
FIG. 20 is an x-z plan cross-sectional view of the phase plate of the fifth example.
Figure 21:
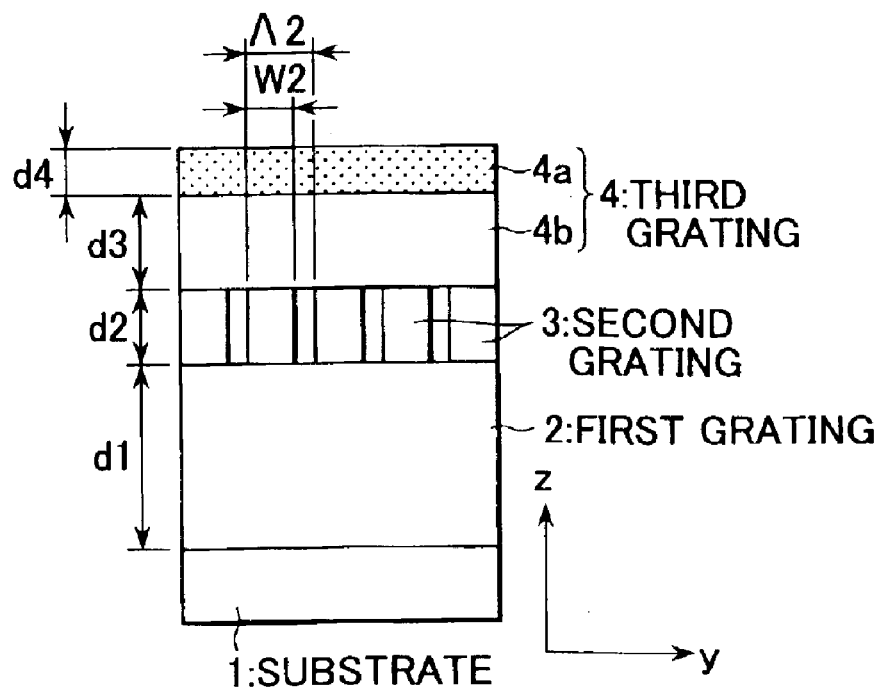
FIG. 21 is a y-z plan cross-sectional view of the phase plate of the fifth example.

Next, a fifth example of the present invention will be described. FIG. 19 is a perspective view showing the structure of a phase plate according to the fifth example, FIG. 20 is an x-z plan cross-sectional view of the phase plate shown in FIG. 19, and FIG. 21 is a y-z plan cross-sectional view of the phase plate shown in FIG. 19. In the figures, reference numeral 1 indicates a substrate, and reference numeral 2 indicates a first grating disposed on the substrate 1 and having a predetermined period in one-dimensional manner. Reference numeral 3 indicates a second grating having a predetermined period in the direction perpendicular to the periodic direction of the first grating 2. In addition, a third grating 4 having a predetermined period in the direction perpendicular to the periodic direction of the second grating 3 is disposed. The third grating 4 is formed of gratings 4a and 4b laminated to each other and having refractive indices different from each other (in this example, these two gratings 4a and 4b are collectively treated as one grating and are referred as "third grating"). The three one-dimensional gratings, that is, the first grating 2 to the third grating 4, each have the structure in which a high refractive index material (grating portion) and a low refractive index material (air) are alternately disposed. In addition, the periods of the first grating 2 to the third grating 4 are each formed to be smaller than the wavelength of usable light (visible light), as in the case of the fourth example. Related to this, air is used as an incident side medium; however, a cover made of glass or the like may be used instead.

In addition, the width, depth (thickness), and grating period of the first grating are represented by W1, d1, and Λ1, respectively. The width, depth (thickness), and grating period of the second grating are represented by W2, d2, and Λ2, respectively. The width and grating period of the third grating are represented by W3 and Λ3, respectively. The depths (thicknesses) of the grating 4a and 4b of the third grating 4 are represented by d4 and d3, respectively.

In the fifth example, a λ/4 plate composed of three one-dimensional gratings laminated to each other is formed, and in addition, the periodic directions of the first grating 2 and the second grating 3 and those of the second grating 3 and the third grating 4 are perpendicular to each other. In the first grating 2, $Ta_2O_5$ is used, grating period Λ1 is set to 0.16 μm, thickness d1 is set to 0.565 μm, and filling factor FF1 (=W1/Λ1) is set to 0.81. In the second grating 3, $Ta_2O_5$ is used, grating period Λ2 is set to 0.16 μm, thickness d2 is set to 0.190 μm, and filling factor FF2 (=W2/Λ2) is set to 0.6. In the third grating 4, $SiO_2$ and $Ta_2O_5$ are used for the gratings 4a and 4b, respectively, of the third grating 4; grating period Λ3 is set to 0.16 μm; thicknesses d4 and d3 of the gratings 4a and 4b are set to 0.100 and 0.250 μm, respectively; and filling factor FF3 (=W3/Λ3) is set to 0.81.

Grating periods Λ1, Λ2, and Λ3 are set so that high-order diffraction light other than zero-order light is not generated in the visible light region, that is, are set so that the gratings behave as zero-order gratings.

The effective refractive indices of the first to the third gratings are the same as those in the fourth example. That is, with respect to the polarized light in the x-axis direction, the effective refractive indices are increased from the incident side medium to the substrate side through the gratings 4a and 4b of the third grating 4, the second grating 3, and the first grating 2. In addition, with respect to the polarized light in the y-axis direction, the difference in effective refractive indices are decreased among a plurality of the gratings laminated to each other, that is, among the grating 4b of the third grating 4, the second grating 3, and the first grating 2. The difference in refractive index described above is not always necessarily to be zero, as described above, and the difference may be approximately 0.1 to 0.2. In addition, the tendencies of the effective refractive indices for the TE polarized light and the TM polarized light may be opposite to those described above, as in the case of the fourth example.

Figure 22:
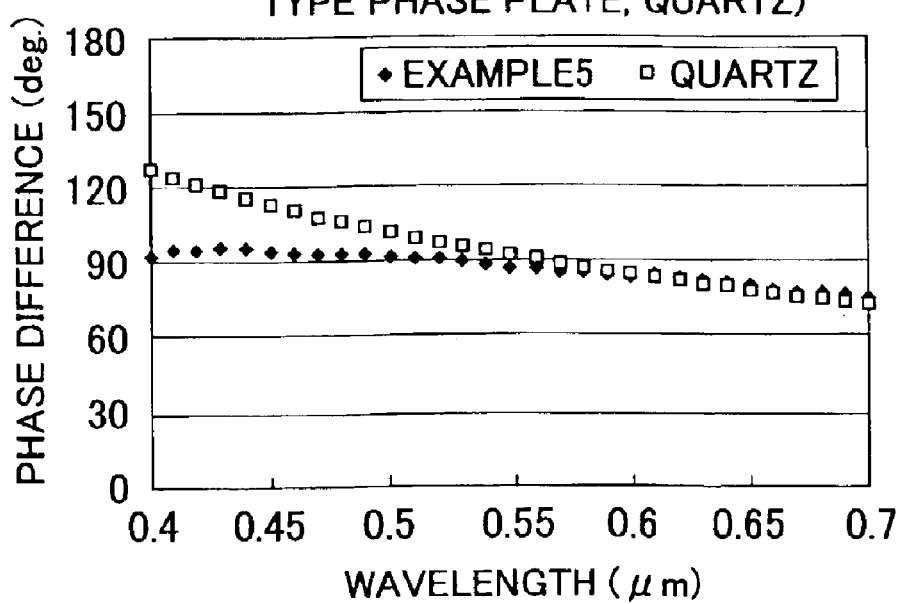
FIG. 22 is a view showing phase difference characteristics of the phase plate of the fifth example together with those of quartz for the sake of comparison.
Figure 23:
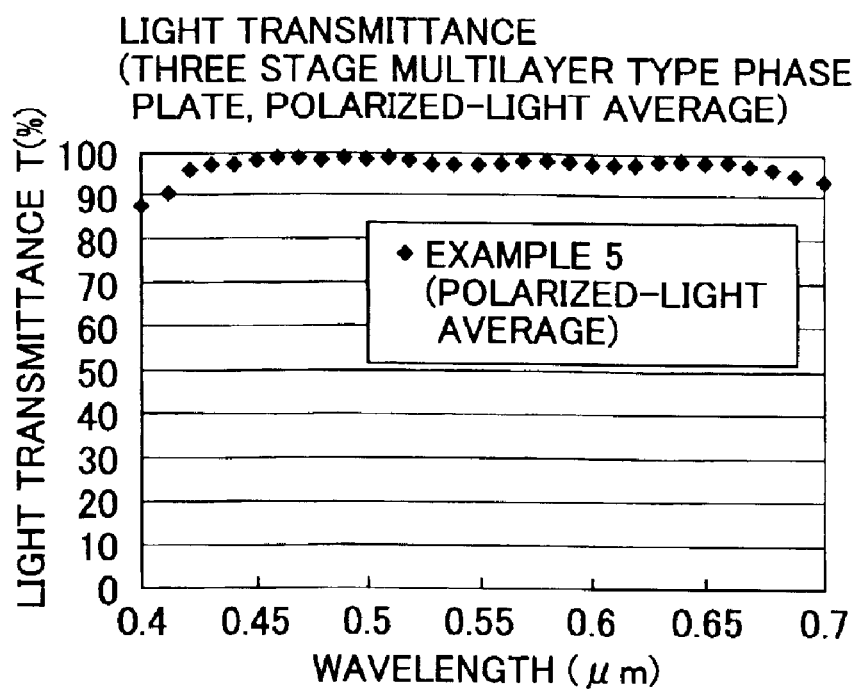
FIG. 23 is a perspective view showing light transmittance characteristics of the phase plate of the fifth example.

In FIG. 22, the phase difference characteristics of the three-stage multilayer type λ/4 plate according to the fifth example are shown. In FIG. 23, the light transmittance characteristics (polarized-light average) are shown. In FIG. 22, the phase difference characteristics of quartz are also shown. It is clearly understood from FIG. 22 that the wavelength dependence of the phase difference is very small, and that the error span is significantly decreased to approximately −10° to +10° with respect to 90°. In addition, as can be seen from FIG. 23, superior light transmittance characteristics can be realized, and a light transmittance of approximately 95% or more is realized in the visible light region. In the case of the three-stage multilayer type, the thicknesses of the grating materials can be further decreased as compared to the case of the two-stage multilayer type, and each of the grating structures can be easily formed.

Sixth Example

Figure 24:
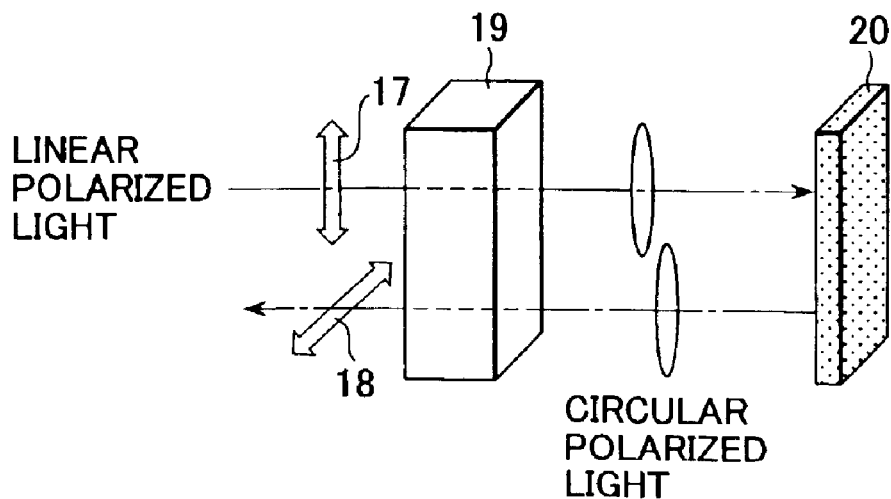
FIG. 24 is a view showing an optical system of a sixth example.

Next, a sixth example of the present invention will be described. In the sixth example, an optical system using the phase plate of the fourth example will be described. FIG. 24 is a view showing the optical system according to the sixth example. In this figure, an optical system in which the phase plate is used in a double path structure is shown. In FIG. 24, reference numeral 19 indicates the phase plate ($\lambda/4$ plate) of the fourth example, and reference numeral 20 indicates a mirror. In addition, reference numeral 17 indicates incident light, and reference numeral 18 indicates emitted light (light to be observed). In this example, incident light (linear polarized light) 17 having a uniform polarization direction enters the multilayer type $\lambda/4$ plate 19, and after being converted into circular polarized light, incident light 17 is reflected from the mirror 20. Subsequently, after incident light 17 again enters the multilayer type $\lambda/4$ plate 19 and is emitted therefrom, the light thus emitted has a polarization direction rotated by 90° with respect to incident light 17.

The light transmittance when the polarization direction is rotated can be obtained by equation (21) shown below.

$$T = \cos^2(\Gamma/2 - \pi/2) \quad (21)$$

Figure 25:
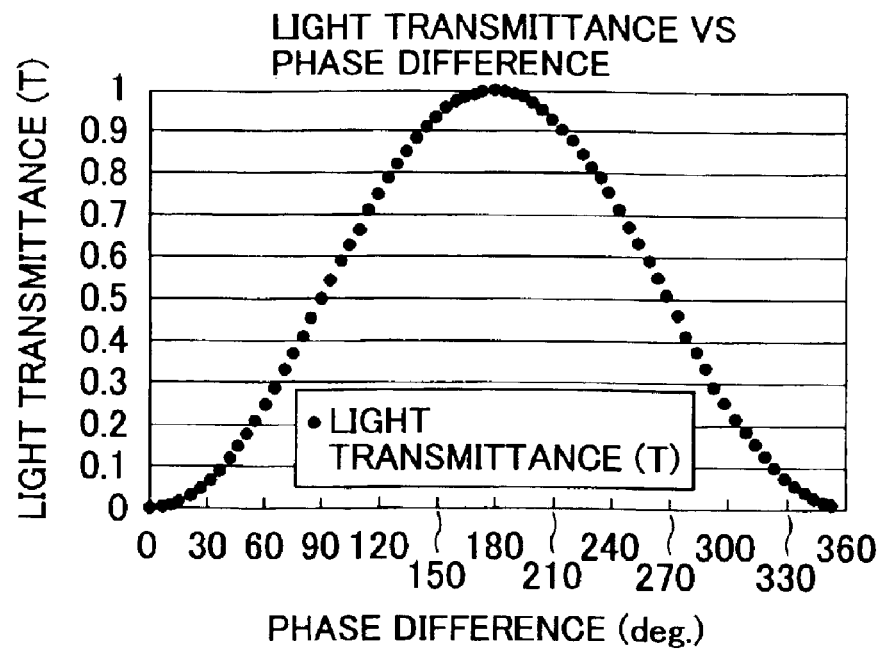
FIG. 25 is a graph showing light transmittance characteristics of the phase plate with the change in phase difference which occurs when the polarization direction is rotated.

T is the light transmittance when the rotation of polarized light is taken into consideration, and $\Gamma$ is the phase difference. Concerning this equation, a graph in which the transverse axis represents phase difference $\Gamma$ and the vertical axis represents light transmittance T is shown in FIG. 25. In more particular about light transmittance T, when the light intensity of polarized light 17 incident on the double pass optical system is assumed to be 1, light transmittance T indicates the ratio of light intensity observed by using a polarizer disposed perpendicular to the incident linear polarized light to that of light 18 which passes through the double-path optical system and is emitted therefrom so that the polarization direction is rotated. In particular, when the phase difference between incident light 17 and emitted light 18 in the double-path optical system is 180°, since the polarization direction of emitted light 18 thus observed is that obtained by rotating the polarization direction of incident linear polarized light 17 exactly by 90°, the light-intensity ratio thus observed becomes one (=1/1) with respect to the incident light.

However, concerning the light transmittance obtained from equation (21), it should be remembered that reflected light by surface reflection or multiple reflection of the phase plate element have not been taken into consideration. Accordingly, in order to study substantial light transmittance, light transmittance obtained from consideration of surface reflection and multiple reflection of the phase plate element and the light transmittance obtained from equation (21) in which the rotation of polarized light is take into consideration must be simultaneously examined. As a result, substantial light transmittance in an optical system using a double-path structure can be evaluated by the product of the light transmittance of the phase plate and the light transmittance obtained from equation (21) in which the intensity loss of transmitted light caused by the rotation of polarized light is taken into consideration.

Figure 26:
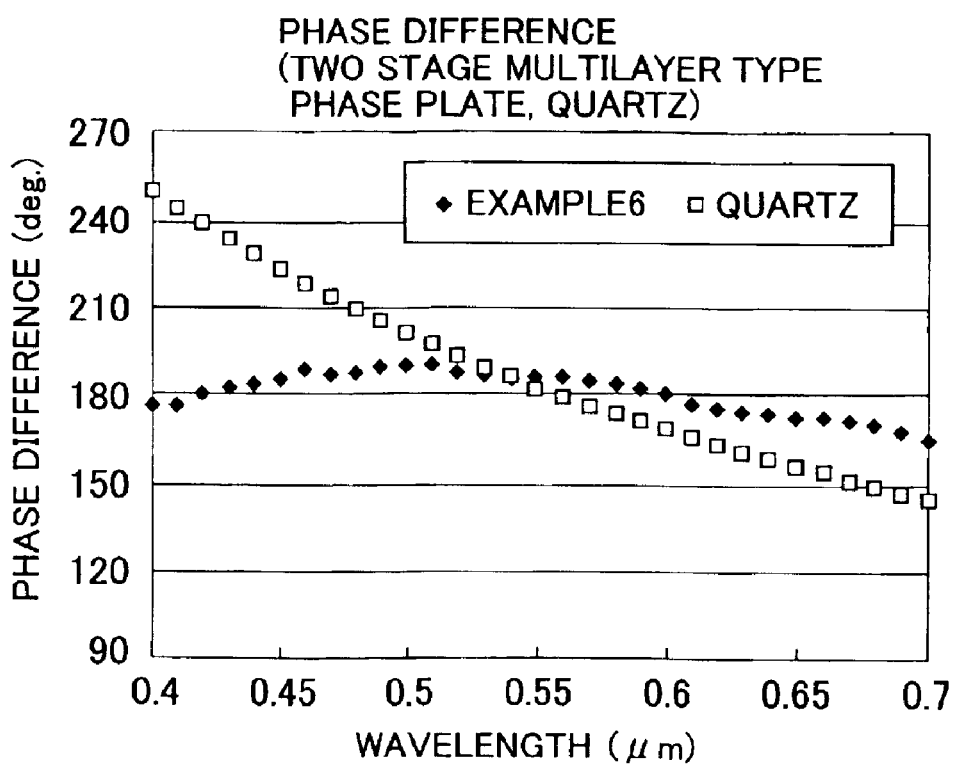
FIG. 26 is a graph showing phase difference characteristics of the phase plate of the sixth example together with those of quartz for the sake of comparison.
Figure 27:
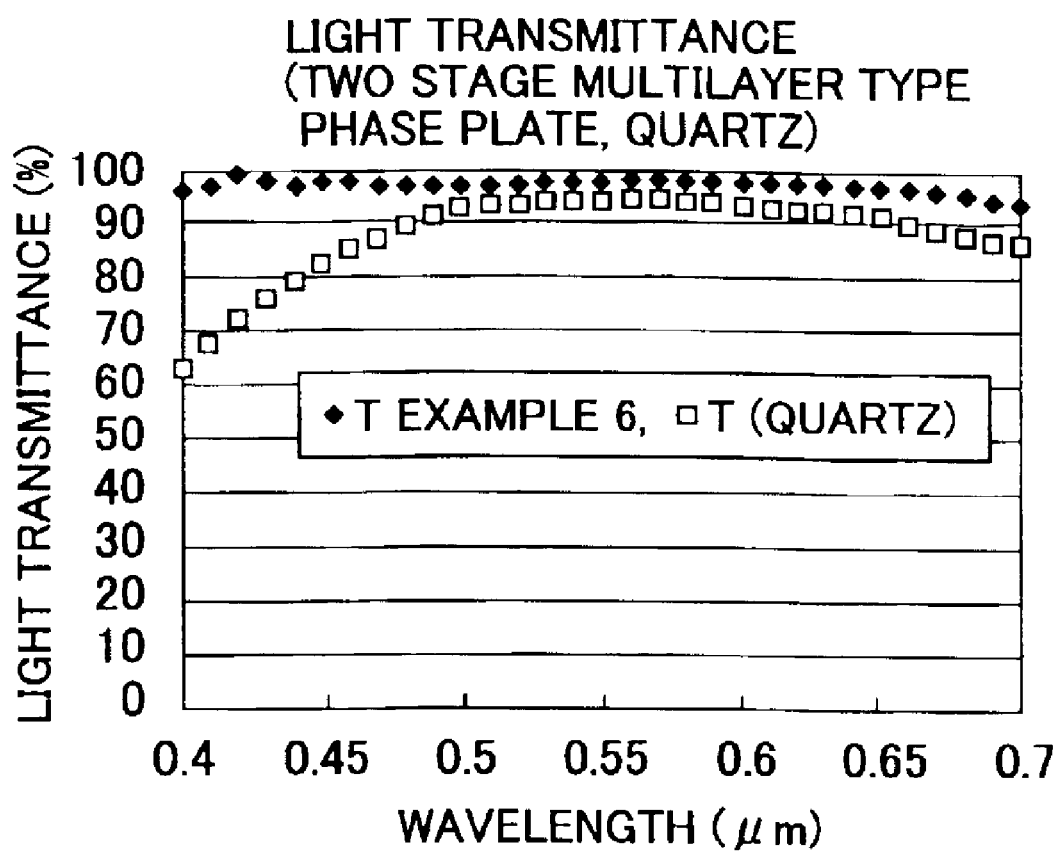
FIG. 27 is a graph showing substantial light transmittance characteristics of the phase plate of the sixth example together with those of quartz for comparison.

The phase difference characteristics in the double-path optical system according to the sixth example are shown in FIG. 26. In FIG. 26, the phase difference characteristics of quartz are also shown. Compared to the conventional quartz plate, it can be understood that the wavelength dependence is significantly reduced. In addition, the substantial light transmittance obtained by the method described above is shown in FIG. 27. In FIG. 27, for the sake of comparison, substantial light transmittance of the conventional $\lambda/4$ plate made quartz is also shown. The Fresnel reflection of the conventional $\lambda/4$ quartz plate is calculated based on a light transmittance of 95% and using the value obtained from the refractive index (n=1.55) of quartz.

In addition, in order to realize a phase difference of 90° at a designed wavelength $\lambda0$ of 0.55 $\mu$m, the thickness of quartz is set to 15.3 $\mu$m. When a conventional $\lambda/4$ quartz plate is used, the phase difference largely depends on the wavelength. Accordingly, although being superior in the vicinity of the designed wavelength, it can be seen that the substantial light transmittance of the $\lambda/4$ quartz plate is decreased at shorter and longer wavelength sides. As shown in FIG. 26, the reason for this is that the phase difference of quartz disadvantageously has large wavelength dependence.

On the contrary, since the double-path optical system using the two-stage multilayer type phase plate of the sixth example has significantly reduced wavelength dependence of phase difference and decreased reflectance in each polarization direction, a superior light transmittance of approximately 96% or more can be realized approximately over the entire visible light region (approximately in the range of from 0.4 to 0.7 $\mu$m).

Optical systems using double paths as described above can be applied, for example, to reflective color liquid crystal display devices. Compared to a conventional $\lambda/4$ plate, when the multilayer type phase plate of the present invention is used, the reflectance of the phase plate itself can be decreased, the optical loss can be decreased, and in addition, the color reproducibility can be significantly improved since the wavelength dependence is reduced as compared to a conventional phase plate, whereby improvement in display quality can be expected. In addition, since a dielectric material is used as a grating material, volume expansion and the change in refractive index caused by heat can also be suppressed, and hence stable performance can be obtained. In addition, since structural birefringence has a large amount of birefringence, it is expected that the thickness of element can be decreased. Furthermore, when a metal such as Al is used for the substrate 1 of the phase plate, or the multilayer type phase plate of the this example is formed on a broadband reflection film composed of a dielectric multilayer film, a phase plate 19 and a mirror 20 may be integrated to form an integral thin element.

Seventh Example

Next, a multilayer type phase plate according to a seventh example of the present invention will be described. In the multilayer type phase plate of this example, at least two grating element portions each composed of a substrate and a grating are laminated to each other so that the gratings thereof oppose each other.

Figure 28A:
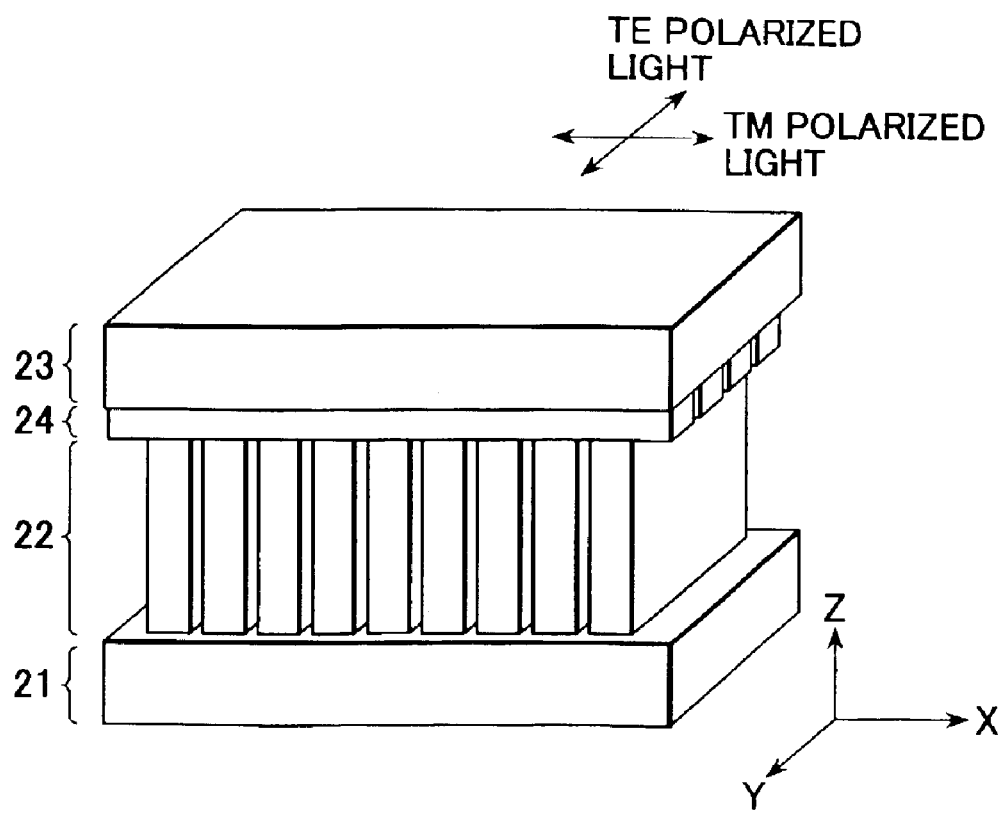
FIG. 28A is a schematic perspective view showing the structure of a multilayer type phase plate of a seventh example.
Figure 28B:
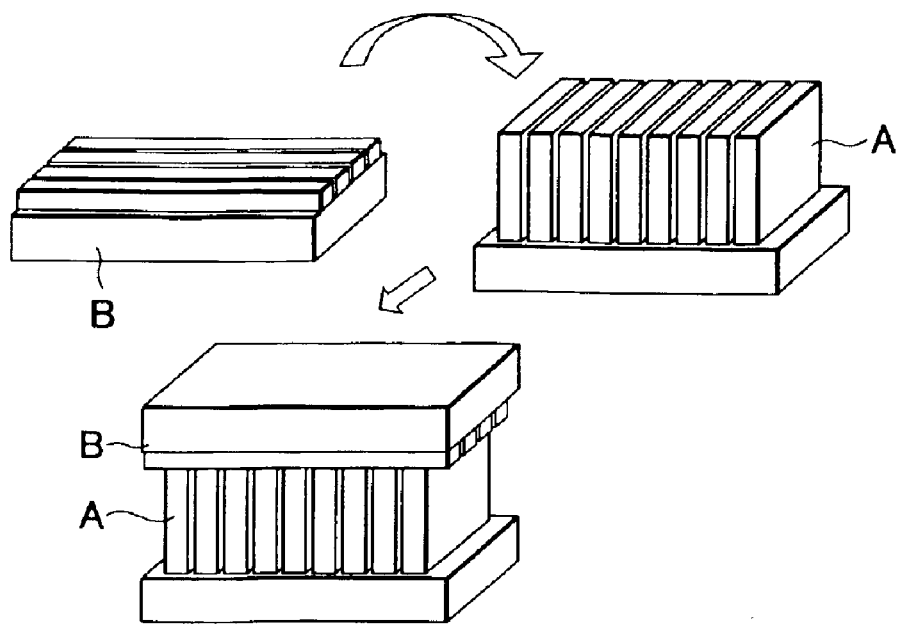
FIG. 28B is a view showing steps of manufacturing the multilayer type phase plate of the seventh example.
Figure 29:
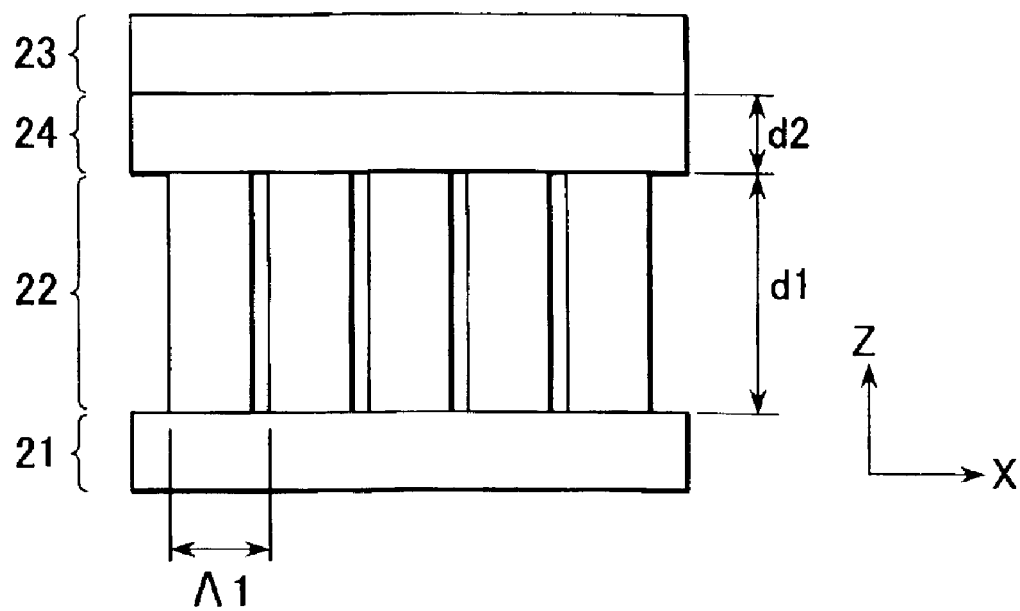
FIG. 29 is an x-z plan cross-sectional view of the multilayer type phase plate of the seventh example.
Figure 30:
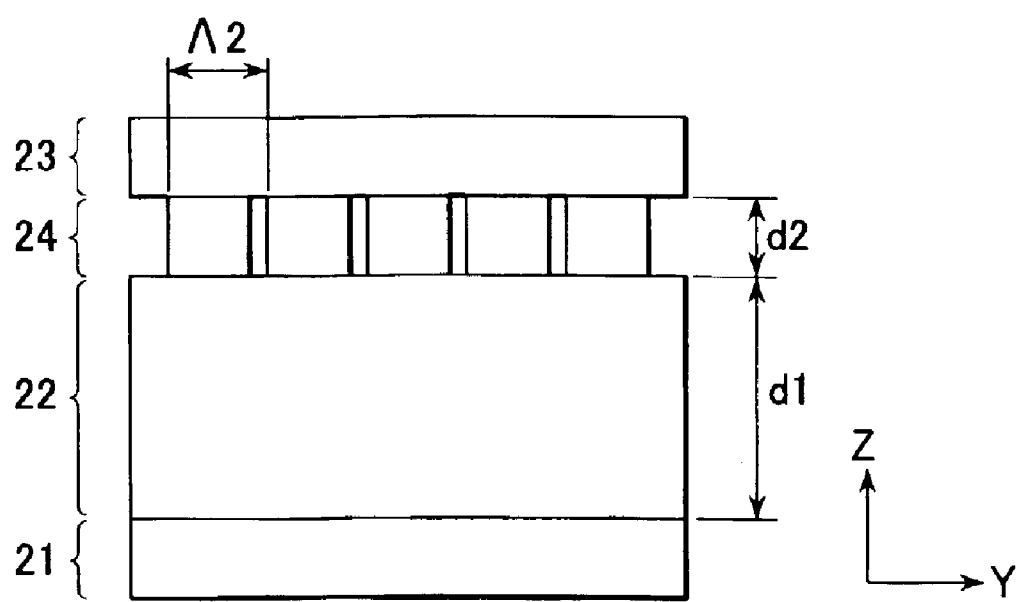
FIG. 30 is a y-z plan cross-sectional view of the multilayer type phase plate of the seventh example.

FIGS. 28A to 30 are views each showing a schematic structure of the phase plate of the seventh example. FIG. 28A is a perspective view of the phase plate, and FIG. 28B is a view showing steps of forming the phase plate. FIG. 29 is an x-z plane cross-sectional view of the phase plate, and FIG. 30 is a y-z plan cross-sectional plane view of the phase plate.

This phase plate comprises a first substrate 21, a first grating 22 having a grating period smaller than the wavelength of usable light, a second grating 24, which has a grating period smaller than the wavelength of usable light and is disposed so that the periodic directions of the first and the second gratings intersect approximately perpendicularly each other, and a second substrate 23. These four constituent elements described above are laminated to each other in that order.

As a particular manufacturing method, for example, the first grating 22 having height (depth) d1 and the second grating 24 having height (depth) d2 are formed on the first substrate 21 and the second substrate 23, respectively, by a method such as etching, electron beam drawing, LIGA process, photolithography, multiple-light-flux laser interference, or multilayer thin-film formation.

First grating element portion A composed of the first substrate 21 and the first grating 22 and second grating element portion B composed of the second substrate 23 and the second grating 24 are laminated to each other so that the gratings 22 and 24 oppose each other and that the periodic directions thereof are approximately perpendicular to each other. In this step, the grating surfaces of the both gratings can be tightly brought into contact with each other for lamination by an optical contact method.

By using this type of manufacturing method, compared to the case in which only gratings are laminated to each other, a multilayer type phase plate can be easily manufactured.

As materials for the first substrate 21, the first grating 22, the second substrate 23, and the second grating 24, glass (refractive index ns1 of 1.8), $Ta_2O_5$, glass (refractive index ns2 of 1.6), and $Ta_2O_5$ (refractive index n of 2.139) are used, respectively. In addition, as a medium surrounding the gratings, air is used.

In the first grating 22, grating period $\Lambda1$ is set to 0.16 $\mu$m, grating depth d1 is set to 0.90 $\mu$m, and filling factor FF1 is set to 0.8, and in the second grating 24, grating period $\Lambda2$ is set to 0.16 $\mu$m, grating depth d2 is set to 0.25 $\mu$m, and filling factor FF2 is set to 0.6. Grating periods $\Lambda1$ and $\Lambda2$ are determined so that high-order diffraction light other than zero-order diffraction light is not generated in the visible light region.

In FIG. 28A, the y axis direction and the x axis direction are represented by A direction and B direction, respectively, and the effective refractive indices of the respective directions are represented by n(A) and n(B).

When the effective refractive indices n1(A) and n1(B) of the first grating and the effective refractive indices n2(A) and n2(B) of the second grating are estimated by EMT, the following values are obtained at a wavelength $\lambda=0.55$ $\mu$m They are:

refractive index n1(A) of the first grating 22 for TE polarized light is 1.965;
refractive index n1(B) of the first grating 22 for TM polarized light is 1.633;
refractive index n2(A) of the second grating 24 for TE polarized light is 1.372; and
refractive index n2(B) of the second grating 24 for TM polarized light is 1.774.

The reason the designed values described above are used will be described. First, concerning the polarized light in the x direction, the refractive index n1(B) of the first grating 22 for the polarized light in the x direction and the refractive index n2(B) of the second grating 24 for the polarized light in the x direction are set to 1.633 and 1.774, respectively, and the effective refractive indices are approximately equivalent to each other (the difference is 0.2 or less). Accordingly, with respect to the polarized light in the x direction, the Fresnel reflection is not substantially allowed to occur at the interface between the first grating 22 and the second grating 24.

Next, concerning the polarized light in the y direction, the refractive index n1(A) of the first grating 22 for the polarized light in the y direction and the refractive index n2(A) of the second grating 24 for the polarized light in the y direction are set to 1.965 and 1.372, respectively, and the effective refractive indices are slightly different from each other.

When the effective refractive indices described above are not changed, with respect to the polarized light in the y direction, the Fresnel reflection may occur at the interface of the first grating 22 and the second grating 24. In addition, when the Fresnel reflection is considered which is generated by the difference in refractive index between the first substrate 21 and the first grating 22 and between the second substrate 23 and the second grating 24, decrease in light transmittance may occur in some cases.

In consideration of the probable problems described above, in the first substrate 21 and the first grating 22 laminated to each other, the refractive index ns1 of the first substrate 21 is preferably set so that the difference between ns1 and the effective refractive index n1(A) of the first grating 22 for the polarized in the y direction and the difference between nx1 and the effective refractive index n1(B) of the first grating 22 for the polarized light in the x direction decrease while the balances of difference in refractive index therebetween are well maintained.

In particular, refractive index ns1 of the first substrate 21 is preferably between effective refractive index n1(A) of the first grating 22 for the polarized light in the y direction and effective refractive index n1(B) of the first grating 22 for the polarized light in the x direction.

In addition, the same relationship as described above is applied to the relationship among refractive index ns2 of the second substrate 23, effective refractive index n2(A) of the second grating 24 for the polarized light in the y direction, and effective refractive index n2(B) of the second grating 24 for the polarized light in the x direction.

In this example, refractive index ns1 of the first substrate 21 is set to 1.80, and refractive index ns2 of the second substrate 23 is set to 1.60, so that the Fresnel reflections at the interface between the first substrate 21 and the first grating 22 and at the interface between the second substrate 23 and the second grating 24 are simultaneously decreased, and that decrease in light transmittance is minimized.

However, the present invention is not limited to the structure in which the values described above are used. For example, in the case in which only one of the polarized light in the y direction and the polarized light in the x direction is allowed to pass through the phase plate of this example, in the substrate and the corresponding grating adjacent thereto, the refractive index of the substrate may be set to approximately equivalent to one of the effective refractive indices of the corresponding grating for the polarized light in the y direction and that in the x direction. As a result, the Fresnel reflection of the polarized light passing through the phase plate can be reduced.

In addition, in the above two sets each having the substrate and the grating adjacent thereto, the relationship of refractive indices described above may be set for only one of the two sets described above. As a result, the structure can be formed in which the Fresnel reflection can be reduced only at the interface between the substrate and the grating of the one set described above. In consideration of individual applications, the structure may be appropriately formed.

When the structure is formed as described in this example, the Fresnel reflections at the interfaces of the two sets of the substrates and the gratings can be simultaneously suppressed, and the decrease in light transmittance of the entire phase plate can be minimized.

Figure 31:
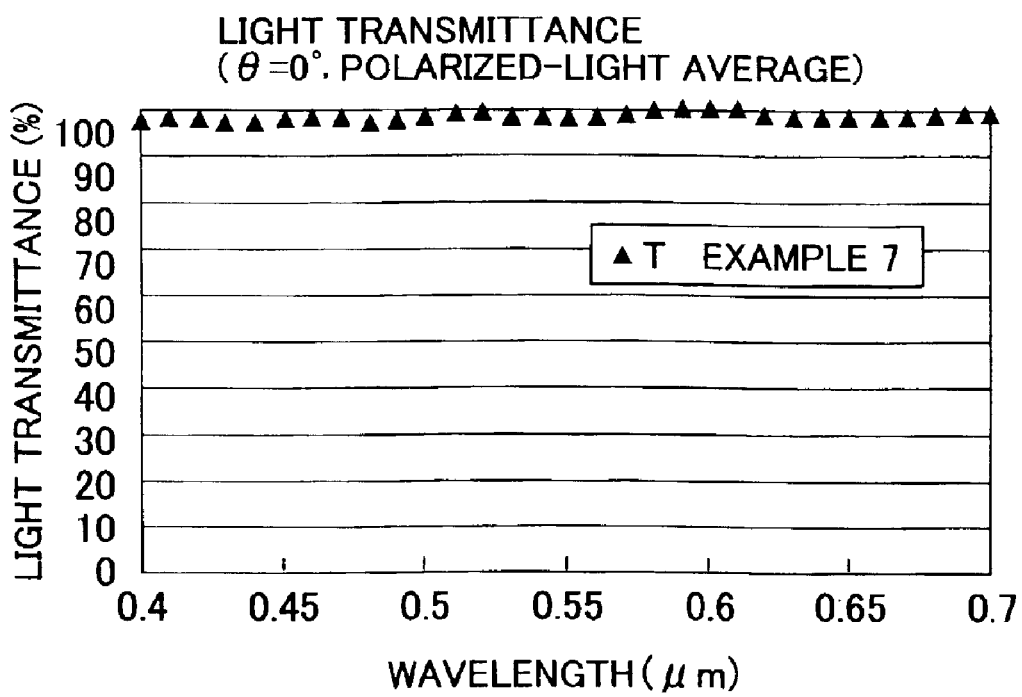
FIG. 31 is a graph showing light transmittance characteristics of the multilayer type phase plate of the seventh example.

FIG. 31 is a graph showing the light transmittance characteristics at an incident angle of 0° of the phase plate according to this example. As shown in FIG. 31, a light transmittance of approximately 97% or more can be realized over the entire visible light region, that is, in the range of from 0.40 to 0.70 µm.

Figure 32:
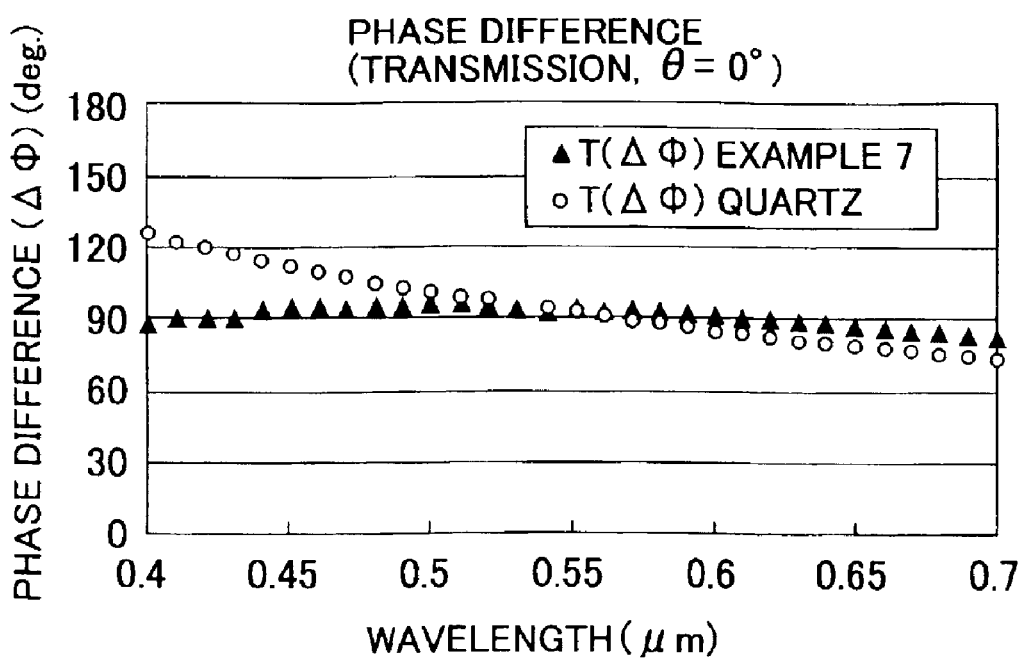
FIG. 32 is a graph showing phase difference characteristics of the multilayer type phase plate of the seventh example.

In addition, FIG. 32 is a graph showing the phase difference characteristics. Compared to the results of a conventional phase plate formed of a quartz thin film, the wavelength dependence is significantly reduced, and over the entire visible light region in the range of from 0.40 to 0.70 µm, a phase difference of approximately 80° to 95° can be realized, and on the whole, the phase plate can serve as a λ/4 plate over the entire visible light region.

In this example, since the grating surfaces of the gratings of the multilayer type phase plate are covered with the substrates 21 and 23, degradation of performances, which is caused by distortion of gratings due to the presence of excreted human oil, particles, or dust, and by damage done to the gratings by scratching or friction, can be advantageously avoided.

In addition, in order to prevent the Fresnel reflection at an incident surface of the multilayer type phase plate, it is necessary to provide an antireflection coat formed of a general single-layer film, multilayer film, or the like on the incident surface or to form minute irregularities (for example, minute pyramid structures or conical structures disposed regularly or irregularly) smaller than the wavelength of usable light on the substrate surface. In the case described above, it is not necessary to provide the antireflection coat or the like on minute end surfaces of each grating, and the film or the like may be provided on the substrate surface having a relatively large area. Accordingly, compared to the structure in which only the gratings are provided, as described above, the multilayer type phase plate can be easily formed, and in addition, an antireflection effect can also be easily obtained.

Furthermore, since conventional film type phase plates are formed of polymer materials, the performances are seriously degraded by heat. Accordingly, under high temperature conditions, the phase plate cannot be satisfactorily used due to insufficient performance or cannot be used at all in many cases, and when being used, sufficient cooling systems must be additionally considered. However, in the multilayer type phase plate of this example, dielectric materials such as $Ta_2O_5$ are used, degradation of performances hardly occurs by heat application, and hence the phase plate of this example exhibits superior performances even under high temperature conditions. For example, the phase plates of this example can be effectively applied to optical systems, such as liquid crystal projectors, which are always operated under high temperature conditions.

Eighth Example

Next, an eighth example of the present invention will be described. In the eighth example, a double-path optical system using the multilayer type phase plate of the seventh example will be described. The structure is the same as the double-path optical system of the sixth example except that the phase plate is replaced with the multilayer type phase plate of the seventh example. Accordingly, the optical system of this example will be described with reference to FIG. 24. That is, in FIG. 24, reference numeral 19 indicates the multilayer type phase plate of the seventh example. The rest of the structure is equal to that described in the sixth example.

Of course, the multilayer type phase plate 19 of this example serves as a λ/4 plate broadly in the visible light region.

The optical characteristics at an incident angle of 0° of the multilayer type phase plate 19 of this double-path optical system will be described.

Figure 33:
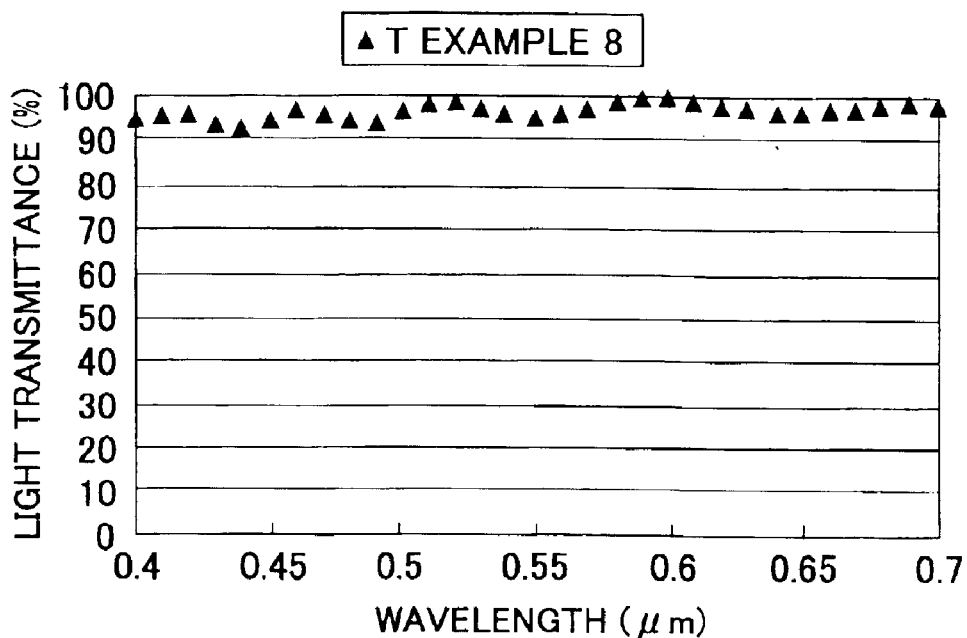
FIG. 33 is a graph showing light transmittance characteristics of a multilayer type phase plate of an eighth example at an incident angle of 0°.

First, the light transmittance characteristics of emitted light 18 with respect to incident light 17 are shown in FIG. 33. In the light transmittance characteristics shown in this example, the influence of the Fresnel reflection at the substrate surface is not taken into consideration. As can be seen in FIG. 33, over the entire visible light region, i.e., in the range of from 0.40 to 0.70 µm, a light transmittance of approximately 95% to 99% can be realized.

As described above, the Fresnel reflection at the substrate surface can be reduced by providing an antireflection coat formed of a general single-layer film, multilayer film, or the like on the substrate surface or forming minute irregularities (for example, minute pyramid structures or conical structures disposed regularly or irregularly) smaller than the wavelength of usable light on the substrate surface.

Figure 34:
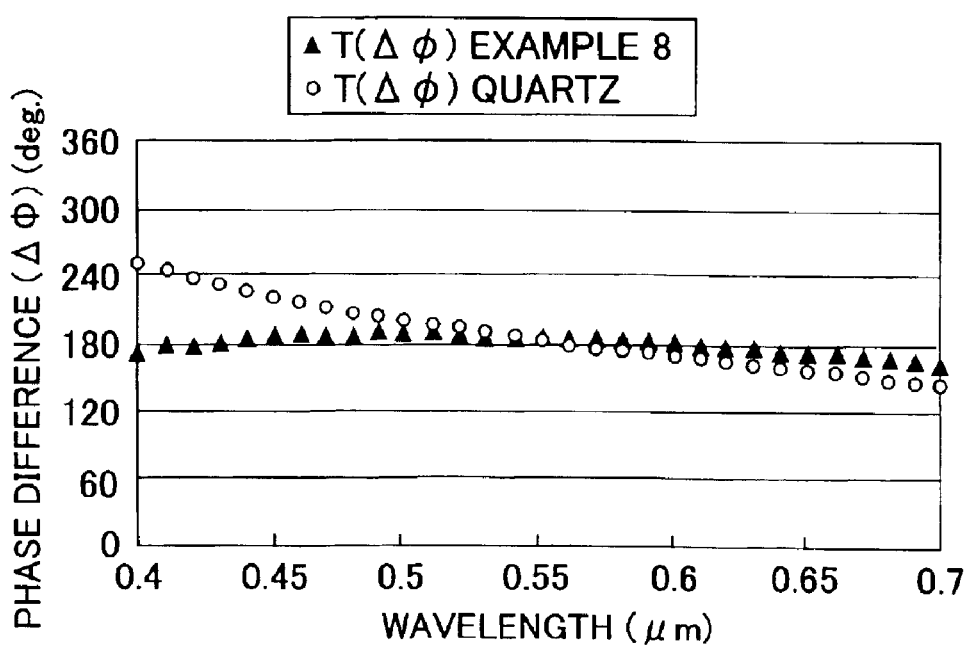
FIG. 34 is a graph showing phase difference characteristics of the multilayer type phase plate of the eighth example at an incident angle of 0°.

In addition, the phase difference characteristics of emitted light 18 with respect to incident light 17 are shown in FIG. 34. As can be seen in FIG. 34, over the entire visible light region, i.e., in the region of from 0.40 to 0.70 µm, a phase difference of approximately 160° to 190° can be realized, and a phase difference of approximately 180° can be realized in a broad wavelength region. The results described above means that a double-path optical system can be realized in which when light passes the multilayer type phase plate 19 twice, the multilayer type phase plate 19 can serve as an approximately one-half wave plate over the entire visible light region. In addition, compared to a conventional phase plate made of quartz, it is understood that the wavelength dependence of the phase difference is small.

Figure 35:
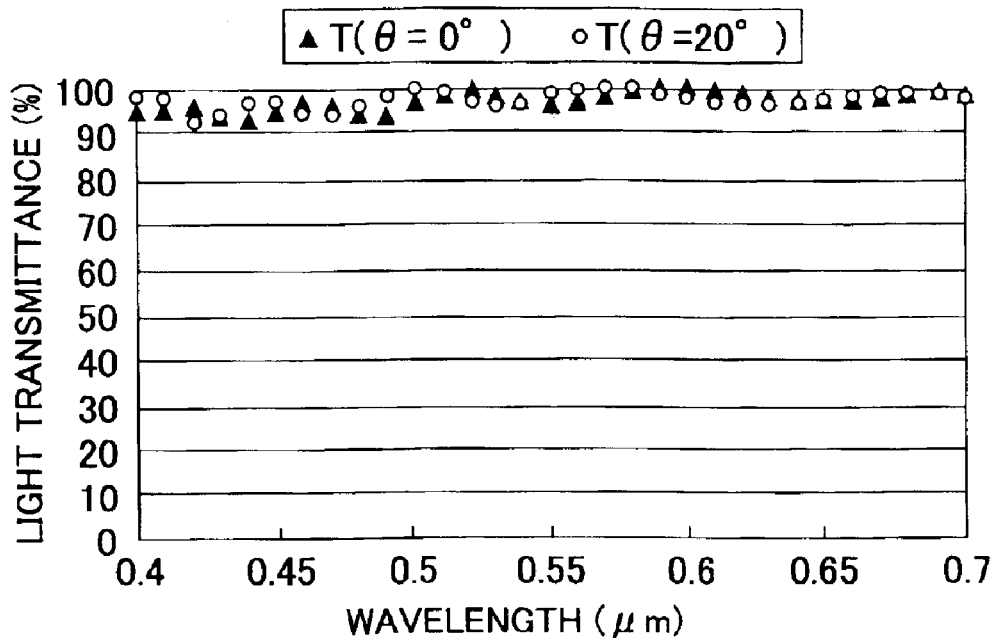
FIG. 35 is a graph showing light transmittance characteristics of the multilayer type phase plate of the eighth example at incident angles of 0° and 20°.
Figure 36:
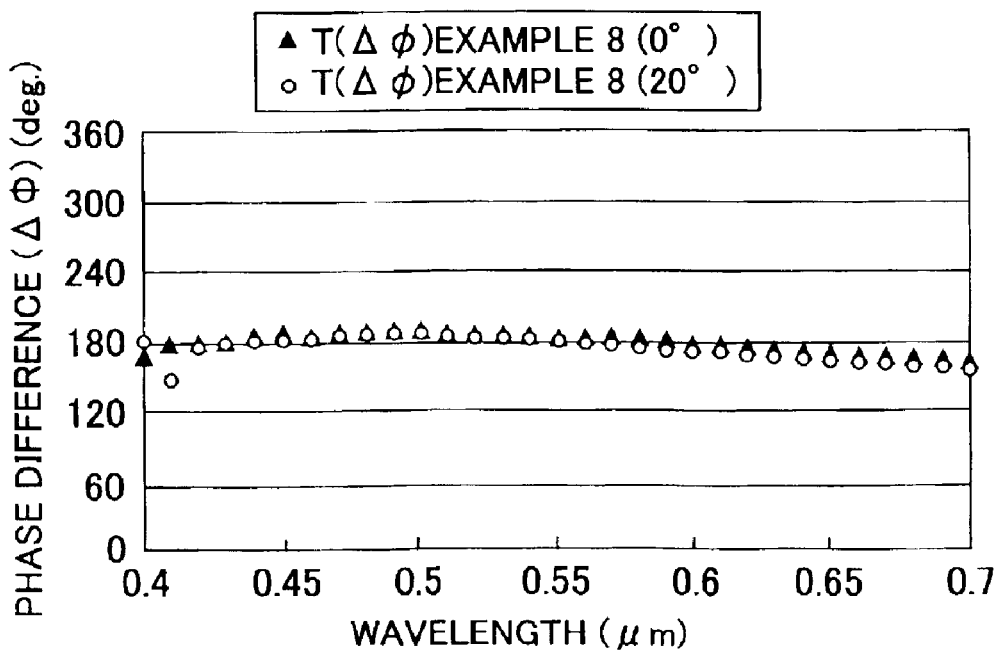
FIG. 36 is a graph showing phase difference characteristics of the multilayer type phase plate of the eighth example at incident angles of 0° and 20°.

Next, the optical characteristics at an incident angle of 20° of the multilayer type phase plate 19 of this double-path optical system will be described. The light transmittance characteristics of emitted light 18 with respect to incident light 17 and the phase difference characteristics are shown in FIGS. 35 and 36, respectively.

Concerning the light transmittance characteristics, the light transmittance has approximately 95% to 99% in the visible light region, that is, light transmittance insensitive to an incident angle can be realized. Concerning the phase different characteristics, a phase difference of approximately 155° to 185° is realized in the visible light region, that is, a phase difference of approximately 180° can be obtained in a broad wavelength region. As described above, in the double-path optical system of this example, an element, which has small incident angle dependence and which functions as an approximately one-half wavelength plate when light passes twice therethrough in the entire visible light region, can be realized.

The incident angle described above means an angle incident from the second substrate on the second grating. In this example, since the refractive index n2 of the second grating is set to 1.60, the incident angle of light incident from air to the second substrate is approximately 33°.

That is, when the multilayer type phase plate is used in practice, the performance equivalent to that described above can be obtained for light having an incident angle of approximately 33° on the second substrate.

As described above, in this example, a phase plate can be realized in which the phase difference is not substantially changed with variation in incident angle by approximately 20°, and over the entire visible light region, a phase difference of approximately 180° between emitted light 18 and incident light 17 can be obtained.

In conventional wavelength plates made of quartz or polymer films, the wavelength dependence and incident angle dependence of the phase difference have been significant, and in order to reduce the above dependences, complicated steps, such as a step of adhering a plurality of phase plates to each other so that the light axes thereof are shifted from each other, must be performed. In addition, since the plurality of phase plate is adhered to each other, it has been disadvantageously difficult to form phase plates each having a smaller thickness.

On the other hand, the multilayer type phase plates described in the seventh and the eighth examples can be easily formed by adhering gratings formed on substrates to each other so that the grating surfaces oppose each other. In addition, the wavelength dependence and incident angle dependence of the phase difference can be simultaneously reduced.

Ninth Example

Figure 37:
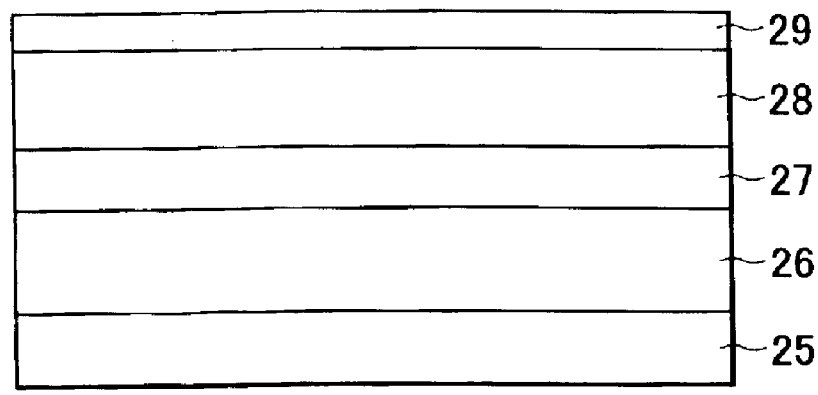
FIG. 37 is cross-sectional view of a reflective liquid crystal display using a multilayer type phase plate of a ninth example.

Next, a ninth example of the present invention will be described. In the ninth example, a reflective display using the multilayer type phase plate of the seventh example will be described. FIG. 37 is a schematic cross-sectional view of the reflective display according to the ninth example.

In FIG. 37, reference numeral 25 indicates a reflector, reference numeral 26 indicates liquid crystal, reference numeral 27 indicates a color filter, reference numeral 28 indicates the multilayer type phase plate of the seventh example (λ/4 plate), and reference numeral 29 indicates a polarizer.

As described in the seventh and eighth examples, the multilayer type phase plate 28 has small wavelength dependence and incident angle dependence of the phase difference. Hence, the multilayer type phase plate 28 can be particularly effective in an optical system, such as display, which must serve as a phase plate for light incident at various angles.

For example, in the case in which a conventional film phase plate is used, due to the wavelength dependence thereof, problems occur in that displayed color purity is degraded, color reproducibility is degraded, displayed color is changed by generation of wavelength shift when display is viewed at an oblique angle, and the like.

On the other hand, when the multilayer type phase plate 28 of this example is used, it is expected that the problems described above may be effectively overcome. That is, easily viewable display can be realized in which color reproducibility is superior, color shift depending on change in incident angle is small, and beautiful image having powerful expression is displayed.

For example, the multilayer type phase plate 28 of this example may be applied to broader applications from small reflective liquid crystal displays such as mobile information terminals, mobile phones, and projector type liquid crystal displays to large-sized displays such as LCD monitors.

In this example, the reflective display is described; however, the multilayer type phase plate in the seventh example may also be applied to a transmissive display. In the case described above, the multilayer type phase plate functioning as a λ/2 plate is used.

Tenth Example

Figure 38:
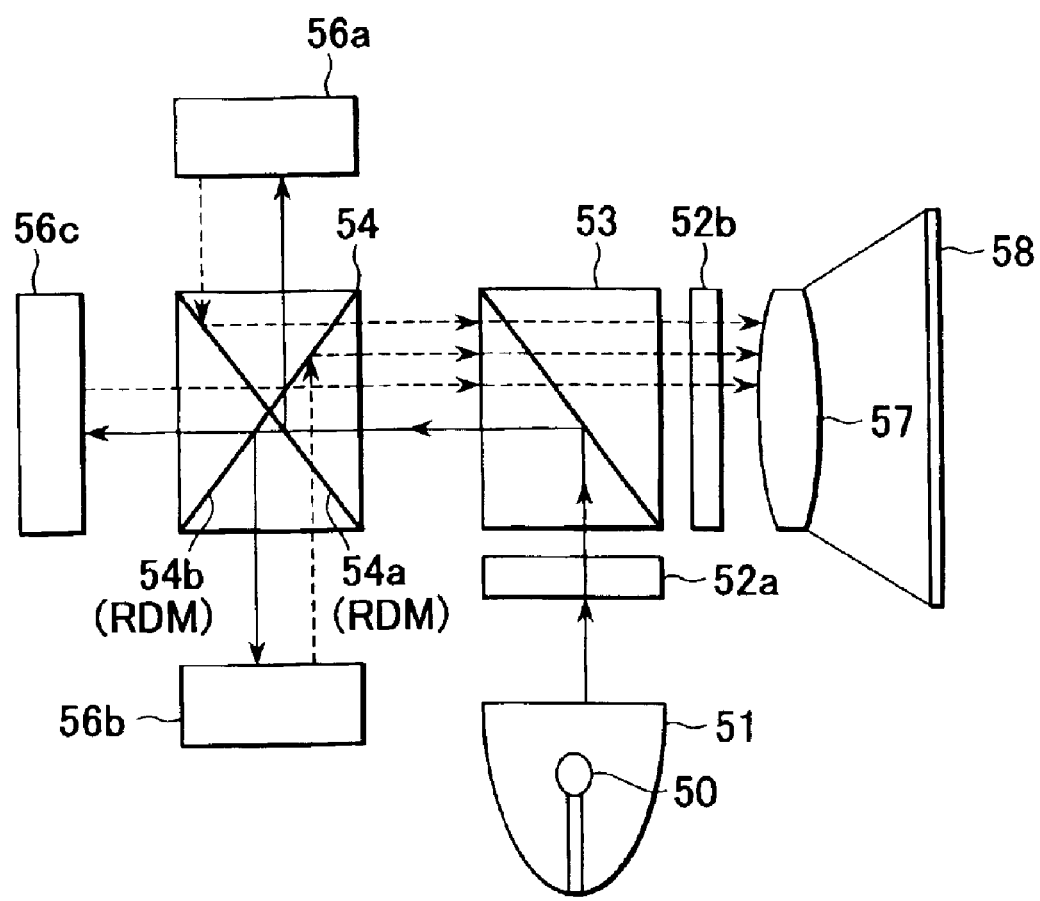
FIG. 38 is a view showing the structure of a liquid crystal projector using a reflective liquid crystal display of a tenth example.
Figure 39:
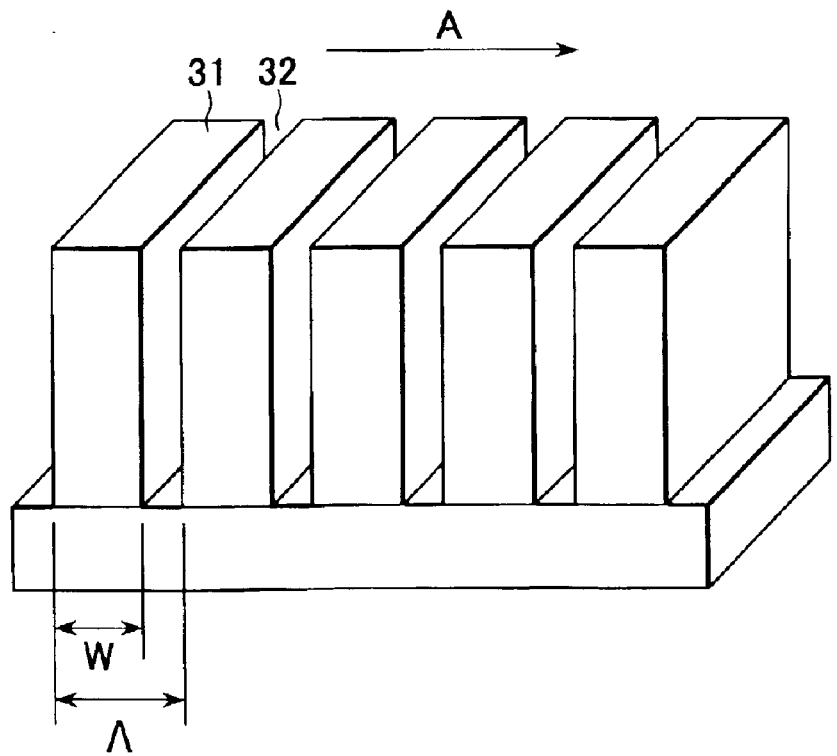
FIG. 39 is a view showing a conventional one-dimensional minute periodic structure.
Figure 40:
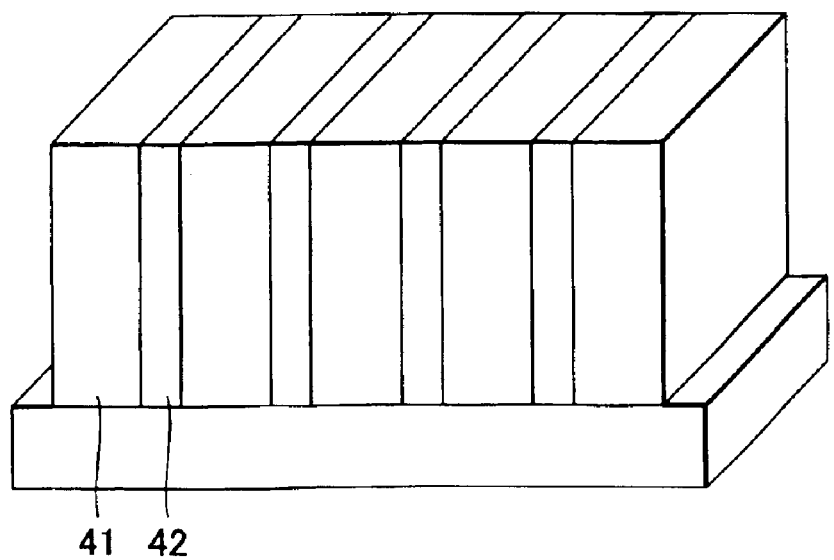
FIG. 40 is a view showing a conventional one-dimensional minute periodic structure.

Next, a tenth example of the present invention will be described. In the tenth example, a liquid crystal projector (optical apparatus) using the reflective display of the ninth example will be described. FIG. 38 is a view showing the structure of this liquid crystal projector.

In FIG. 38, light source 50 is a white light source, which is very small and is formed of a halogen lamp, xenon lamp, or the like. Light emitted from the light source 50 is reflected from a reflector 51 and is emitted as light rays approximately parallel to each other, so that a white polarizing sheet 52a is irradiated therewith. This polarizing sheet 52a has characteristics to allow a first polarization component (s-polarized light or p-polarized light) among the light rays coming from the reflector 51 to pass the polarizing sheet 52a and to absorb a second polarization component (p-polarized light or s-polarized light). Accordingly, a light flux passing through the polarizing sheet 52a is reflected from a polarizing surface of a polarized light beam splitter 53, so that a synthetic cross prism 54 used as a color separation optical system is irradiated therewith.

The synthetic cross prism 54 has the structure in which surfaces adjacent to each other with a right angle provided therebetween of four rectangular prisms are adhered to each other with an adhesive therebetween, a first dichroic mirror surface 54a and a second dichroic mirror surface 54b are provided on the surfaces at which the cross prisms are adhered to each other so as to form a cross shape, and the normal lines of the first dichroic mirror surface 54a and the second dichroic mirror surface 54b each form an angel of approximately 45° with the primary light rays of the incident light. In addition, the first dichroic mirror surface 54a and the second dichroic mirror surface 54b are each formed of a dielectric multilayer film. In particular, the film described above may be formed by alternately laminating several tens of thin films composed of, for example, $TiO_2$ and $SiO_2$, thereby obtaining wavelength-selective reflection characteristics.

The first dichroic mirror surface 54a reflects red color light which is first color light and allows green color light which is second color light and blue color light which is third color light to pass therethrough. In addition, the second dichroic mirror surface 54b reflects blue color light and allows red color light and green color light to pass therethrough. The red color light reflected from the first dichroic mirror surface 54a enters a reflective display (liquid crystal panel) 56a according to the ninth example. The blue color light reflected from the second dichroic mirror surface 54b enters a reflective display (liquid crystal panel) 56b provided with a multilayer type phase plate, as described above. In addition, the green light passing through the first dichroic mirror surface 54a and the second dichroic mirror surface 54b enters a reflective display (liquid crystal panel) 56c for green color light provided with a multilayer type phase plate, as described above.

Image light modulated by the reflective display 56a for red color light enters the synthetic cross prism 54, is then reflected from the first dichroic mirror surface 54a, and finally passes through the second dichroic mirror surface 54b. In addition, image light modulated by the reflective display 56b for blue color light enters the synthetic cross prism 54, passes through the first dichroic mirror surface 54a, and is then reflected from the second dichroic mirror surface 54b. In a manner similar to that described above, image light modulated by the reflective display 56c for green color light enters the synthetic cross prism 54 and then passes through the first dichroic mirror surface 54a and the second dichroic mirror surface 54b.

Image light color-synthesized in the synthetic cross prism 54 as described above passes through the polarized light beam splitter 53 and the polarizing sheet 52b and is subsequently projected on a screen 58 by a projection lens 57 to form an enlarged image.

The reflective liquid crystal display of this example uses the multilayer type phase plate, and compared to a conventional reflective liquid crystal display, the wavelength dependence and the incident angle dependence of phase difference are reduced. In this example, application to a reflective liquid crystal display is only described; however, the phase control element of this example can also be applied to a transmissive liquid crystal display, and in this case, the wavelength dependence and the incident angle dependence of phase difference are also significantly reduced. In addition, the multilayer type phase plate of the present invention can be applied to optical systems of various optical devices in addition to those described above.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical element comprising:
a substrate; and
a plurality of periodic structures laminated to each other and provided on the substrate, the periodic structures each having a period smaller than a predetermined wavelength of usable light;
wherein, when the plurality of periodic structures comprises k periodic structures (k is an integer of one or more) each having a period in a first direction and l periodic structures (l is an integer of zero or more) each having a period in a second direction perpendicular to the first direction, the following equation is satisfied for two designed wavelengths $\lambda_1$ and $\lambda_2$ in a visible light region:

$$\left(\sum_{i=1}^{k} \Delta n_i d_i - \sum_{j=0}^{l} \Delta n_j d_j\right) / \lambda_1 = \left(\sum_{i=1}^{k} \Delta n'_i d_i - \sum_{j=0}^{l} \Delta n'_j d_j\right) / \lambda_2$$

where $\Delta n_i$ indicates the difference of the refractive index of an ith periodic structure, having the period in the first direction, for TE polarized light from that for TM polarized light with respect to designed wavelength $\lambda_1$;
$d_i$ indicates the thickness of the ith periodic structure having the period in the first direction;
$\Delta n_j$ indicates the difference of the refractive index of a jth periodic structure, having the period in the second direction, for TE polarized light from that for TM polarized light with respect to designed wavelength $\lambda_1$;
$d_j$ indicates the thickness of the jth periodic structure having the period in the second direction;
$\Delta n'_i$ indicates the difference of the refractive index of the ith periodic structure, having the period in the first direction, for TE polarized light from that for TM polarized light with respect to designed wavelength $\lambda_2$; and
$\Delta n'_j$ indicates the difference of the refractive index of the jth periodic structure, having the period in the second direction, for TE polarized light from that for TM polarized light with respect to designed wavelength $\lambda_2$, the TE polarized light being polarized light having a polarization direction perpendicular to the periodic direction of the periodic structure, the TM polarized light being polarized light having a polarization direction parallel to the periodic direction of the periodic structure.

2. An optical element according to claim 1, wherein the visible light region is in a wavelength region of from 400 to 700 nm.

3. An optical element according to claim 1, wherein the plurality of periodic structures comprises:
a first periodic structure provided on the substrate, having the period in a first direction; and
a second periodic structure provided above the substrate, having the period in a second direction, which is perpendicular to the first direction.

4. An optical element according to claim 3, further comprising:
a third periodic structure provided above the substrate, having the period in a third direction;
wherein the first periodic structure, the second periodic structure, and the third periodic structure are provided in that order from the substrate side,
the first direction and the second direction are perpendicular to each other, and
the second direction and the third direction are parallel to each other.

5. An optical modulation device for modulating incident light, comprising:
a polarized light beam splitter for converting non-polarized light into two types of linear polarized light;
a reflection member reflecting one of said two types of linear polarized light in the same direction as that of the other said polarized light; and
an optical element according to claim 3,
wherein one of said two types of linear polarized light enters the optical element according to claim 3, whereby the polarization direction thereof is rotated by 90°.

6. An image display apparatus comprising:
a polarizer;
an optical element according to claim 3; and
liquid crystal.

7. An optical element according to claim 1, wherein the substrate comprises:
a first substrate and a second substrate; wherein the plurality of periodic structures comprises:
a first periodic structure;
a second periodic structure, having a period in the direction approximately perpendicular to that of a period of the first structure; and
wherein the first substrate, the first periodic structure, the second periodic structure, and the second substrate are provided in that order from a light incident side to a light emission side.

8. A method for manufacturing an optical element according to claim 7, comprising the steps of:
forming the first periodic structure on the first substrate;
forming the second periodic structure on the second substrate; and
laminating the first substrate to the second substrate so that the first periodic structure and the second periodic structure oppose each other, and that the periodic directions thereof are approximately perpendicular to each other.

9. An optical element according to claim 7, wherein the refractive index of the first substrate is in the range of from the effective refractive index of the first periodic structure for polarized light having a polarization direction approximately parallel to the periodic direction of the first periodic structure and the effective refractive index of the first periodic structure for polarized light having a polarization direction approximately perpendicular to the periodic direction of the first periodic structure.

10. An optical element according to claim 7, wherein the refractive index of the first substrate is approximately equivalent to at least one of:
the effective refractive index of the first periodic structure for polarized light having a polarization direction approximately parallel to the periodic direction of the first periodic structure; and
the effective refractive index of the first periodic structure for polarized light having a polarization direction approximately perpendicular to the periodic direction of the first periodic structure.

11. An optical modulation device for modulating incident light, comprising:
a polarized light beam splitter for converting non-polarized light into two types of linear polarized light;
a reflection member reflecting one of said two types of linear polarized light in the same direction as that of the other said polarized light; and
an optical element according to claim 7,
wherein one of said two types of linear polarized light enters the optical element according to claim 7, whereby the polarization direction thereof is rotated by 90°.

12. An image display apparatus comprising:
a polarizer;
an optical element according to claim 7; and
liquid crystal.

13. An optical modulation device for modulating incident light, comprising:
a polarized light beam splitter for converting non-polarized light into two types of linear polarized light;
a reflection member reflecting one of said two types of linear polarized light in the same direction as that of the other said polarized light; and
an optical element according to claim 1,
wherein one of said two types of linear polarized light enters the optical element according to claim 1, whereby the polarization direction thereof is rotated by 90°.

14. An image display apparatus comprising:
a polarizer;
an optical element according to claim 1; and
liquid crystal.

15. An optical element comprising:
a substrate;
a plurality of periodic structures laminated to each other and provided on the substrate, each period being smaller than a wavelength of usable light;
wherein incident light has a first polarized light having a first polarization component, and the difference in effective refractive index between at least two contacted with each other periodic structures of said plurality of periodic structures for the first polarized light is 0.2 or less.

16. An optical element according to claim 15, wherein the incident light has a second polarized light having a second polarization component which perpendicularly intersects the first component, and the effective refractive indices of said plurality of periodic structures for the second polarized light are increased from a light incident side to the substrate side.

17. An optical modulation device for modulating incident light, comprising:
a polarized light beam splitter for converting non-polarized light into two types of linear polarized light;
a reflection member reflecting one of said two types of linear polarized light in the same direction as that of the other said polarized light; and
an optical element according to claim 15,
wherein one of said two types of linear polarized light enters the optical element according to claim 15, whereby the polarization direction thereof is rotated by 90°.

18. An image display apparatus comprising:
a polarizer;
an optical element according to claim 15; and
liquid crystal.

* * * * *

UNITED STATES PATENT AND TRADEMARK OFFICE
CERTIFICATE OF CORRECTION

PATENT NO. : 6,947,215 B2  Page 1 of 1
APPLICATION NO. : 10/327182
DATED : September 20, 2005
INVENTOR(S) : Hikaru Hoshi It is certified that error appears in the above-identified patent and that said Letters Patent is hereby corrected as shown below:

<u>Title page,</u>
Item [*] Notice, delete "by 0 days" and insert -- by 96 days --.

Signed and Sealed this

Twentieth Day of June, 2006

JON W. DUDAS
*Director of the United States Patent and Trademark Office*